US012812524B2

(12) United States Patent
Wang et al.

(10) Patent No.: US 12,812,524 B2
(45) **Date of Patent: *Nov. 24, 2026**

(54) DETERMINING A MACHINE-LEARNING ARCHITECTURE FOR NETWORK SLICING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 18/774,224

(22) Filed: Jul. 16, 2024

(65) Prior Publication Data

US 2024/0373337 A1 Nov. 7, 2024

Related U.S. Application Data

(63) Continuation of application No. 17/753,816, filed as application No. PCT/US2019/059094 on Oct. 31, 2019, now Pat. No. 12,075,346.

(51) Int. Cl.
*H04L 41/16* (2022.01)
*G06F 18/20* (2023.01)
(Continued)

(52) U.S. Cl.
CPC .......... *H04W 48/18* (2013.01); *G06F 18/285* (2023.01); *H04L 41/16* (2013.01); *H04W 8/08* (2013.01);
(Continued)

(58) Field of Classification Search
CPC ....... H04W 48/18; H04W 8/08; H04W 24/10; H04W 64/003; H04W 4/50; G06F 18/285;
(Continued)

(56) References Cited

U.S. PATENT DOCUMENTS

2018/0287891 A1 10/2018 Shaw et al.
2018/0317133 A1 11/2018 Sciancalepore et al.
(Continued)

FOREIGN PATENT DOCUMENTS

WO WO-2020080989 A1 * 4/2020 ............. G06N 3/098

OTHER PUBLICATIONS

G. Zhu, J. Zan, Y. Yang and X. Qi, "A Supervised Learning Based QoS Assurance Architecture for 5G Networks," in IEEE Access, vol. 7, pp. 43598-43606, 2019, doi: 10.1109/ACCESS.2019.2907142.

*Primary Examiner* — Thai Nguyen
(74) *Attorney, Agent, or Firm* — Lowenstein Sandler LLP

(57) ABSTRACT

This document describes techniques and devices for determining a machine-learning architecture for network slicing. A user equipment (UE) executes a first application associated with a first requested quality-of-service level. The UE selects a first machine-learning architecture based on the first requested quality-of-service level. The UE transmits, to a network-slice manager of a wireless network, a first machine-learning architecture request message to request permission to use the first machine-learning architecture. The UE receives, from the network-slice manager, a first machine-learning architecture response message that grants permission to use the first machine-learning architecture based on a first network slice. The UE wirelessly communicates data for the first application using the first machine-learning architecture, the first machine-learning architecture being configured to compute an output based on an input using coefficients determined by the user equipment.

20 Claims, 10 Drawing Sheets

(51) Int. Cl.

| | |
|---|---|
| ***H04W 8/08*** | (2009.01) |
| ***H04W 24/10*** | (2009.01) |
| ***H04W 48/18*** | (2009.01) |
| ***H04W 64/00*** | (2009.01) |

(52) U.S. Cl.
CPC ......... *H04W 24/10* (2013.01); *H04W 64/003* (2013.01)

(58) Field of Classification Search
CPC ..... H04L 41/16; H04L 41/5051; G06N 3/044; G06N 3/0442; G06N 3/0464; G06N 3/09; G06N 3/092; G06N 20/00; G06N 3/045; G06N 3/063; H04Q 2213/13054; H04Q 2213/13098
See application file for complete search history.

(56) References Cited

U.S. PATENT DOCUMENTS

| | | | |
|---|---|---|---|
| 2019/0073607 | A1 | 3/2019 | Jia et al. |
| 2020/0351718 | A1 | 11/2020 | Dong et al. |
| 2021/0158151 | A1 | 5/2021 | Wang et al. |

* cited by examiner

DETERMINING A MACHINE-LEARNING ARCHITECTURE FOR NETWORK SLICING

CROSS-REFERENCE TO RELATED APPLICATIONS

This application is a continuation of U.S. application Ser. No. 17/753,816 entitled, "DETERMINING A MACHINE-LEARNING ARCHITECTURE FOR NETWORK SLICING," filed Mar. 15, 2022. U.S. application Ser. No. 17/753,816 is a national phase application filed under 35 U.S.C. § 371, of International Patent Application No. PCT/US2019/059094 entitled "DETERMINING A MACHINE-LEARNING ARCHITECTURE FOR NETWORK SLICING" filed on Oct. 31, 2019, the disclosures of which are incorporated herein by reference in their entirety.

BACKGROUND

The evolution of wireless communication networks oftentimes stems from evolving user needs or requested quality-of-service (QOS) levels. A quality-of-service level is defined by one or more quality-of-service parameters, such as latency, throughput, reliability, error rates, or the like. Wireless communication networks have evolved over time from satisfying a quality-of-service level associated with voice calling to additionally satisfying a quality-of-service level associated with web access and video streaming. As the quantity of application grows, and capabilities of different user equipments (UEs) vary, it can be challenging for a single wireless communication network to meet a diverse set of requested quality-of-service levels.

SUMMARY

Techniques and apparatuses are described for determining a machine-learning (ML) architecture for network slicing. A user equipment (UE) and a network-slice manager communicate with each other to determine a machine-learning (ML) architecture, which the UE then employs to wirelessly communicate data for an application. In particular, the UE selects a machine-learning architecture that provides a quality-of-service level requested by an application. The network-slice manager accepts or rejects the request based on one or more available end-to-end machine-learning architectures associated with a network slice that supports the quality-of-service level requested by the application. By working together, the UE and the network-slice manager can determine an appropriate machine-learning architecture that satisfies a quality-of-service level associated with the application and forms a portion of an end-to-end machine-learning architecture that meets the quality-of-service level requested by the application.

Aspects described below include a method performed by a user equipment for determining a machine-learning architecture for network slicing. The method includes executing a first application associated with a first requested quality-of-service level and selecting a first machine-learning architecture based on the first requested quality-of-service level. The method also includes transmitting, to a network-slice manager of a wireless network, a first machine-learning architecture request message to request permission to use the first machine-learning architecture. The method additionally includes receiving, from the network-slice manager, a first machine-learning architecture response message that grants permission to use the first machine-learning architecture based on a first network slice. The method further includes wirelessly communicating data for the first application using the first machine-learning architecture.

A machine-learning architecture implemented by the UE, a machine-learning architecture implemented by the base station, and a machine-learning architecture implemented by the entity of a 5G core network (5GC) may operate together to form the end-to-end machine-learning architecture. A machine-learning interface passes information between the machine-learning architectures. In this manner, the end-to-end machine-learning architecture may act as a single distributed machine-learning architecture and may provide an interface between the UE, at least one base station, and an entity of the 5GC.

A machine-learning architecture may represent a particular structure of one or more layers as well as connections between these layers.

Network slicing may instantiate one or more parallel and independent networks that satisfy different quality-of-service levels.

A quality-of-service level may be defined by one or more quality-of-service parameters, such as latency, throughput, reliability, or error rates.

The selecting of the first machine-learning architecture may comprise receiving, from the network-slice manager, an available machine-learning architecture message that identifies available machine-learning architectures associated with the first network slice. The selecting of the first machine-learning architecture may also comprise choosing the first machine-learning architecture from the available machine-learning architectures.

The selecting of the first machine-learning architecture may comprise receiving, from the network-slice manager, a machine-learning architecture selection message that comprises one or more selection rules. The selecting of the first machine-learning architecture may additionally comprise executing the one or more selection rules to determine the first machine-learning architecture.

The method may further comprise wirelessly communicating other data for the first application using the second machine-learning architecture. The selecting of the second machine-learning architecture may be based on the first requested quality-of-service level. The selecting of the second machine-learning architecture may be responsive to the user equipment moving to a geographical location associated with a different base station. The selecting of the second machine-learning architecture may be responsive to the user equipment moving to a geographical location associated with a different tracking area. The selecting of the second machine-learning architecture may be responsive to the user equipment roaming between a home network and a visited network.

A home network may be a network with which the UE is registered. A visited network may be a network with which the UE is not registered.

The method may further comprise executing a second application associated with a second requested quality-of-service level. The method may further comprise selecting a second machine-learning architecture based on the second requested quality-of-service level. The method may further comprise transmitting, to the network-slice manager, a second machine-learning architecture request message to request permission to use the second machine-learning architecture. The method may further comprise receiving, from the network-slice manager, a second machine-learning architecture response message that grants permission to use the second machine-learning architecture based on the first network slice or a second network slice.

The method may further comprise wirelessly communicating other data for the second application using the second machine-learning architecture responsive to receiving the second machine-learning architecture response message. The selecting of the second machine-learning architecture may be based on the second requested second quality-of-service level. The executing of the second application may occur during at least an overlapping portion of time that the first application is executed. The using of the first machine-learning architecture and the using of the second machine-learning architecture may both occur during at least the overlapping portion of time.

The method may further comprise executing a third application associated with a third requested quality-of-service level. The method may further comprise selecting a third machine-learning architecture based on the third requested quality-of-service level. The method may further comprise transmitting, to the network-slice manager, a third machine-learning architecture request message to request permission to use the third machine-learning architecture. The method may further comprise receiving, from the network-slice manager, a third machine-learning architecture response message that does not grant permission to use the third machine-learning architecture. The method may further comprise selecting a default machine-learning architecture responsive to receiving the third machine-learning architecture response message. The method may further comprise transmitting, to the network-slice manager, a fourth machine-learning architecture request message to request permission to use the default machine-learning architecture. The method may further comprise receiving, from the network-slice manager, a fourth machine-learning architecture response message that grants permission to use the default machine-learning architecture based on a third network slice. The method may further comprise wirelessly communicating additional data for the third application using the default machine-learning architecture.

Aspects described below include a user equipment with a radio-frequency transceiver. The user equipment also includes a first processor and first memory system configured to perform any of the methods described.

Aspects described below include a method performed by a network-slice manager for determining a machine-learning architecture for network slicing. The method includes creating a first network slice. The method also includes receiving, from a user equipment, a first machine-learning architecture request message that requests permission to use a first machine-learning architecture. The method additionally includes determining that the first machine-learning architecture is associated with at least one first end-to-end machine-learning architecture of the first network slice. The method further includes transmitting, to the user equipment, a first machine-learning architecture response message that grants permission to use the first machine-learning architecture.

The method may further comprise storing information that relates the first network slice to at least one available end-to-end machine-learning architecture. Determining that the first machine-learning architecture is associated with the at least one first end-to-end machine-learning architecture may comprise determining that the first machine-learning architecture forms a portion of the at least one available end-to-end machine-learning architecture.

The method may further comprise transmitting, to the user equipment, an available machine-learning architecture message that identifies the at least one available end-to-end machine-learning architecture.

The method may further comprise transmitting, to the user equipment, a machine-learning architecture selection message that comprises one or more selection rules enabling the user equipment to determine the first machine-learning architecture.

The method may further comprise creating a second network slice. The method may further comprise receiving, from the user equipment, a second machine-learning architecture request message to request permission to use a second machine-learning architecture. The method may further comprise determining that the second machine-learning architecture is not associated with any second end-to-end machine-learning architectures of the second network slice. The method may further comprise transmitting, to the user equipment, a second machine-learning architecture response message that does not grant permission to use the second machine-learning architecture.

The second machine-learning architecture response message may comprise a third machine-learning architecture associated with at least one of the second end-to-end machine-learning architectures.

Aspects described below also include a network-slice manager comprising a processor and memory system configured to perform any of the methods described.

Aspects described below include a system comprising a user equipment and a network-slice manager.

Aspects described below also include a system with means for determining a machine-learning architecture.

The described methods may be stored as instructions in computer-readable storage media.

BRIEF DESCRIPTION OF THE DRAWINGS

Apparatuses of and techniques for determining a machine-learning architecture for network slicing are described with reference to the following drawings. The same numbers are used throughout the drawings to reference like features and components.

DETAILED DESCRIPTION

Overview

Network slicing enables a wireless communication network to satisfy a diverse set of quality-of-service (QOS) levels. In particular, network slicing enables dynamic partitioning and sharing of a wireless communication network's infrastructure to provide different quality-of-service flows. Generally speaking, network slicing instantiates one or more parallel and independent virtual networks that satisfy different quality-of-service levels. A quality-of-service level is defined by one or more quality-of-service parameters, such as latency, throughput, reliability, or error rates.

To realize a requested quality-of-service level associated with an application, techniques and apparatuses are described for determining a machine-learning (ML) architecture for network slicing. A user equipment (UE) and a network-slice manager communicate with each other to determine a machine-learning (ML) architecture, which the UE then employs to wirelessly communicate data for an application. In particular, the UE selects a machine-learning architecture that provides a quality-of-service level requested by the application. The network-slice manager accepts or rejects the request based on one or more available end-to-end machine-learning architectures associated with a network slice that supports the quality-of-service level requested by the application. By working together, the UE and the network-slice manager can determine an appropriate machine-learning architecture that satisfies a quality-of-service level associated with the application and forms a portion of an end-to-end machine-learning architecture that meets the quality-of-service level requested by the application.

Example Environment

Figure 1:
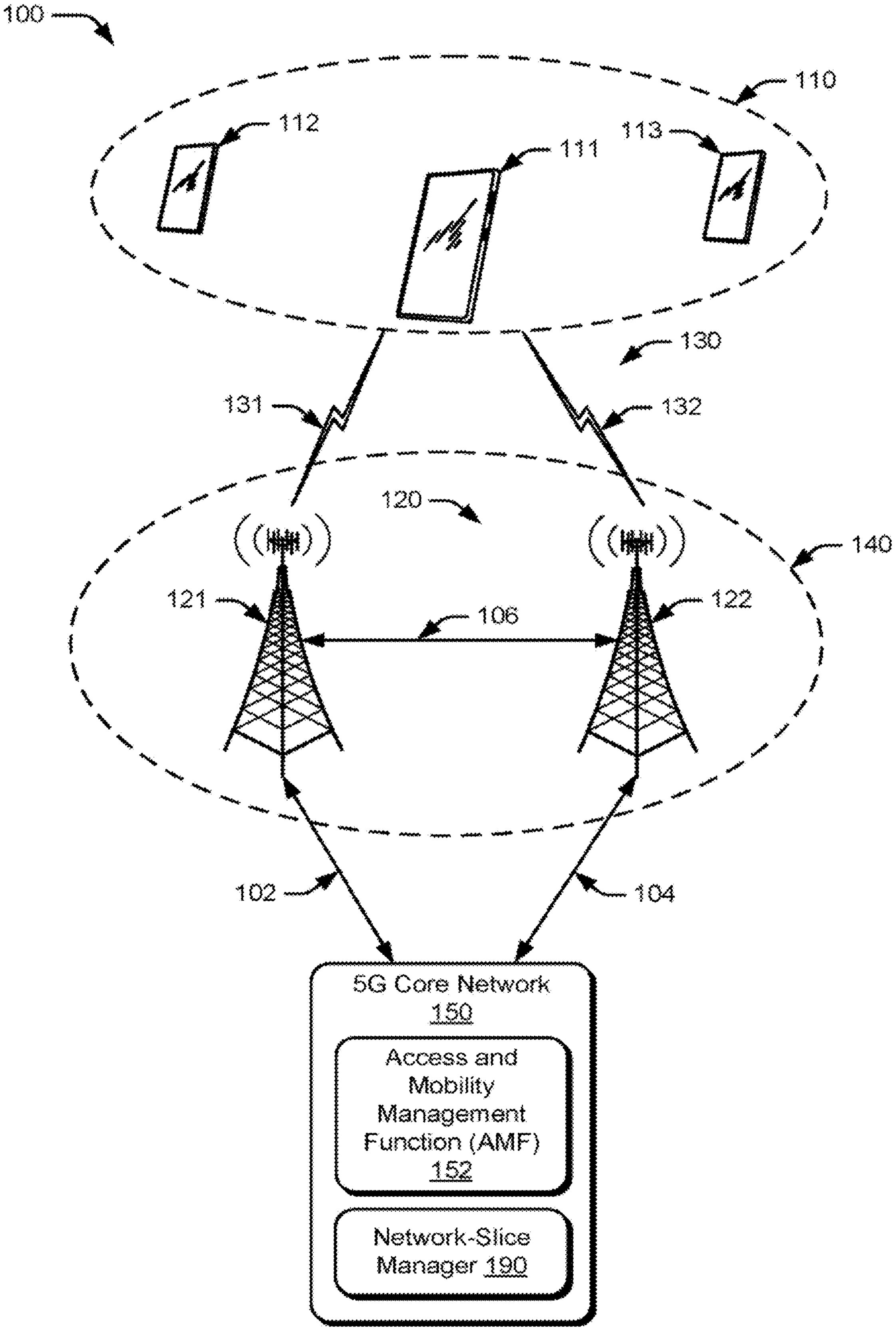
FIG. 1 illustrates an example wireless network environment in which determining a machine-learning architecture for network slicing can be implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, ng-eNB or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Enhanced Long-Term Evolution (eLTE), Fifth-Generation New Radio (5G NR), 4th-Generation (4G) standard, and so forth. Multiple wireless links 130 may be aggregated in a carrier aggregation to provide a higher data rate for the UE 110. Multiple wireless links 130 from multiple base stations 120 may be configured for Coordinated Multipoint (COMP) communication with the UE 110.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a 5G core network (5GC) 150. The base stations 121 and 122 connect, at 102 and 104 respectively, to the 5GC 150 through an NG2 interface for control-plane signaling and using an NG3 interface for user-plane data communications. The base stations 121 and 122 can communicate using an Xn Application Protocol (XnAP) through an Xn interface, or using an X2 Application Protocol (X2AP) through an X2 interface, at 106, to exchange user-plane and control-plane data. Although not shown, the UE 110 may connect, via the 5GC 150, to public networks, such as the Internet, to interact with a remote service.

The 5GC 150 includes an Access and Mobility Management Function 152 (AMF 152), which provides control-plane functions such as registration and authentication of multiple UE 110, authorization, and mobility management in the 5G NR network. The AMF 152 communicates with the base stations 120 in the RAN 140 and also communicate with multiple UE 110, using the base stations 120.

The 5GC 150 also includes a network-slice manager 190. The network-slice manager 190 can be implemented by a server of the 5GC 150. Generally speaking, the network-slice manager 190 uses network slicing to provide different quality-of-service flows through the wireless communication network (e.g., provide different quality-of-service flows between at least one UE 110, at least one base station 120, and the 5GC 150.

Each quality-of-service flow is provided by a network slice, which supports a quality-of-service level requested by an application on the UE 110. In some cases, the network slice provides multiple quality-of-service flows. As described above, a quality-of-service level specifies one or more quality-of-service parameters, such as latency, throughput (e.g., bandwidth or data rate), reliability, or an error rate (e.g., a bit error rate). Other example quality-of-service parameters include availability, packet loss, or jitter. In addition to the quality-of-service level, the network slice can also provide a particular level of security through cryptography. To provide the quality-of-service level, the network-slice manager 190 associates each network slice with one or more end-to-end machine-learning architectures capable of meeting the quality-of-service level, as further described with respect to FIG. 2.

Figure 2:
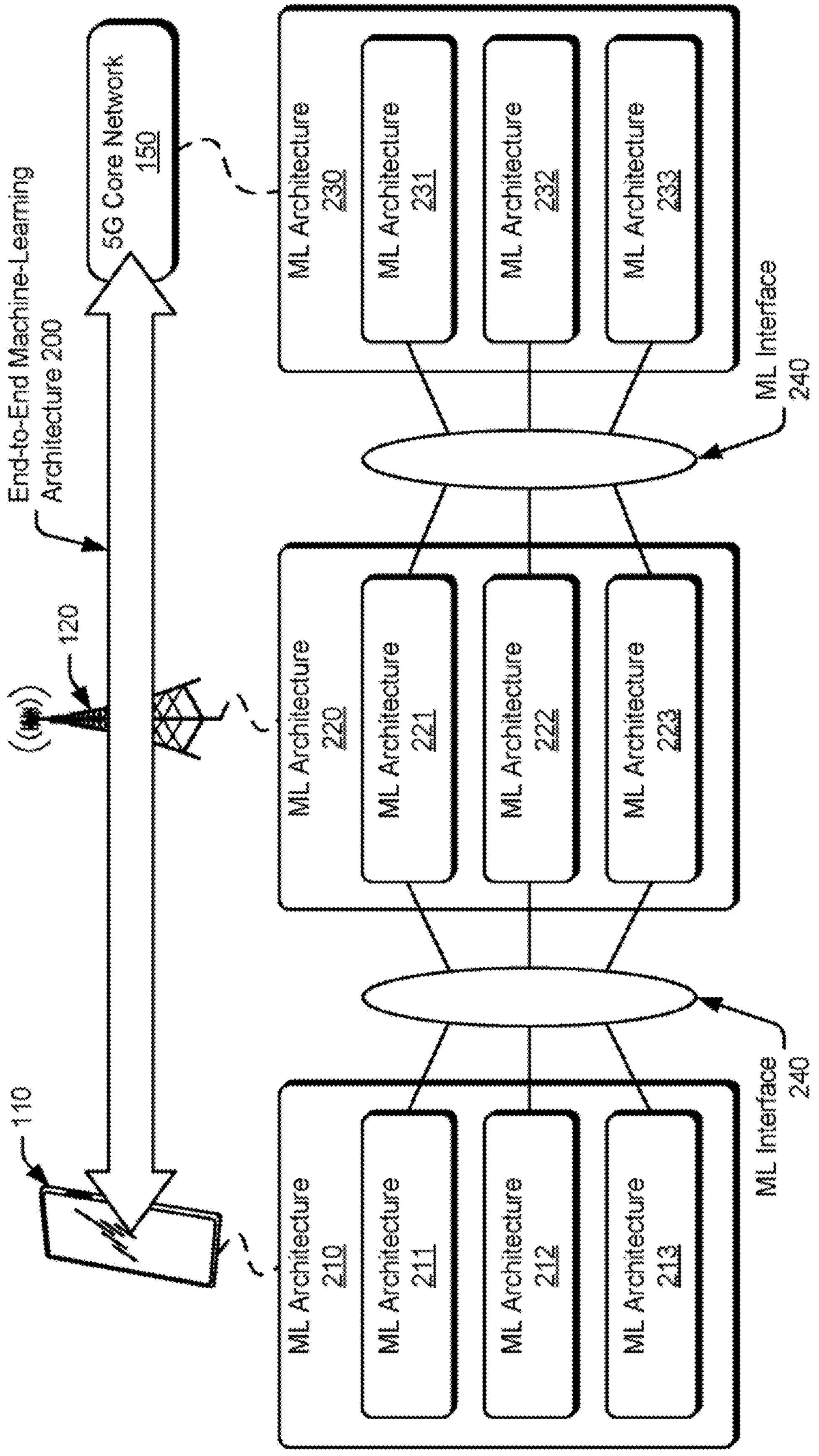
FIG. 2 illustrates an example end-to-end machine-learning architecture for network slicing.

FIG. 2 illustrates an example end-to-end machine-learning architecture 200 for network slicing. In general, the end-to-end machine-learning architecture 200 provides an interface between the UE 110, at least one base station 120, and an entity of the 5GC 150. The entity of the 5GC can include a server or an entity that provides a User Plane Function in the 5GC. In particular, a machine-learning architecture 210 implemented by the UE 110, a machine-learning architecture 220 implemented by the base station 120, and a machine-learning architecture 230 implemented by the entity of the 5GC 150 operate together to form the end-to-end machine-learning architecture 200. A machine-learning interface 240 passes information between the machine-learning architecture 210, the machine-learning architecture 220, and the machine-learning architecture 230. In this manner, the end-to-end machine-learning architecture 200 acts as a single distributed machine-learning architecture. Although not shown, the end-to-end machine-learning architecture 200 can also include an application server proximate to the 5GC 150 for edge computing.

The machine-learning architecture 210, the machine-learning architecture 220, and the machine-learning architecture 230 provide solutions to complex processing, such as the complex functionality used in a wireless communication system. The machine-learning architectures 210, 220, and 230 can replace the conventional complex functionality in a variety of ways, such as by replacing some or all of the conventional processing blocks used in end-to-end processing of wireless communication signals, replacing individual processing chain blocks, and so forth. As an example, the machine-learning architectures 210, 220, and 230 can each perform one or more of the following functions: channel encoding, channel decoding, modulation, demodulation, signal processing (e.g., noise cancellation), encryption, or decryption. As described in further detail with respect to FIG. 3, a machine-learning architecture represents a particular structure of one or more layers as well as connections between these layers. Designs of these machine-learning architectures can be tailored based on capabilities of the respective entities. These capabilities can include available memory, available power, and computational capability. In general, larger amounts of available memory, larger amounts of available power, and/or higher levels of computational capability enable larger and more complex machine-learning architectures to be implemented.

In some cases, the UE 110, the base station 120, and/or the entity of the 5GC 150 can use a variety of different machine-learning architectures. The UE 110 can implement, for example, machine-learning architectures 211, 212, and 213. Likewise, the base station 120 can implement machine-learning architectures 221, 222, and 223, and the entity of the 5GC 150 can implement machine-learning architectures 231, 232, and 233. Designs of these various machine-learning architectures can vary in terms of the quantity of layers, types of layers, order of layers, and connections between layers, as further described with respect to FIG. 3. Differences in the designs of the machine-learning architectures can affect a quality-of-service level that can be realized using the end-to-end machine-learning architecture 200, as further described with respect to FIG. 4.

The network-slice manager 190 communicates with the UE 110, the base station 120, and the entity of the 5GC 150 to select an appropriate machine-learning architecture. In this way, the network-slice manager 190 can selectively activate different end-to-end machine-learning architectures 200 through different combinations of the machine-learning architectures 210, the machine-learning architectures 220, and the machine-learning architectures 230. General characteristics of the machine-learning architecture 210, the machine-learning architecture 230, and the machine-learning architecture 230 are further described with respect to FIG. 3.

Figure 3:
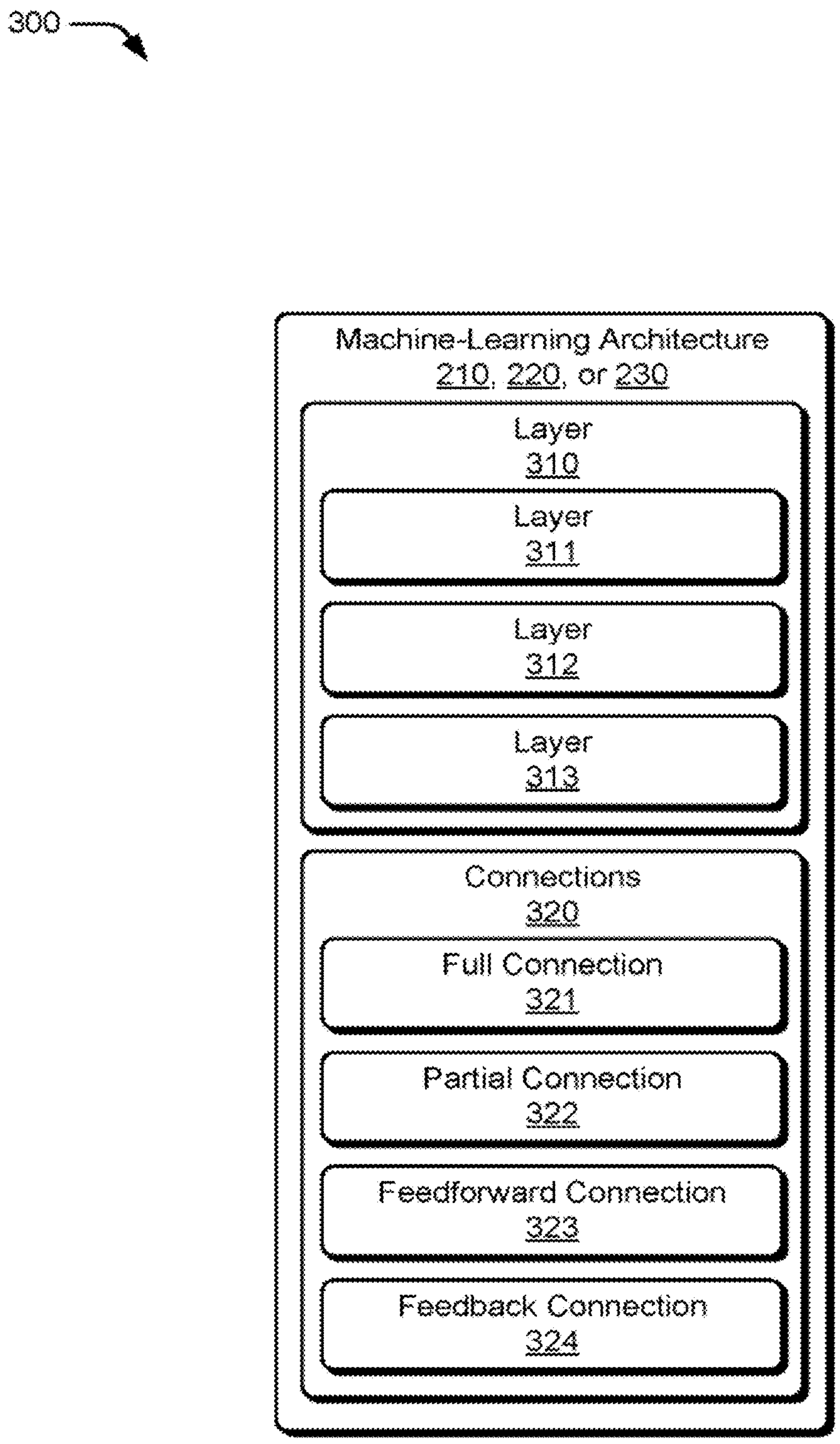
FIG. 3 illustrates example characteristics of a machine-learning architecture for network slicing.

FIG. 3 illustrates an example block diagram 300 of a machine-learning architecture, such as the machine-learning architecture 210, 220, or 230 of FIG. 2. The machine-learning architecture 210, 220, or 230 can be implemented using any combination of software, hardware, and/or firmware. Generally speaking, the machine-learning architecture 210, 220, or 230 defines a structure of one or more layers and connections between these layers (e.g., node connections or layer connections), as further described below. The machine-learning architectures 210, 220, and 230 do not define or specify parameter configurations, which affect operation or performance of the machine-learning architectures 210, 220, and 230. Example parameter configurations include coefficients (e.g., weights or biases), kernel sizes or parameters, activation functions, and stride/pooling configurations. The parameter configurations can also identify nodes that are utilized or layers that are skipped. Modifying various parameter configurations with training or adaptive learning provides an ability to adapt to changing operating conditions. Although the parameter configurations may change, the machine-learning architectures 210, 220, and 230 remain the same. In other words, the machine-learning architectures 210, 220, and 230 are considered to be distinct from the parameter configurations.

Each machine-learning architecture 210, 220, or 230 includes at least one layer 310 (e.g., layers 311, 312, and 313). A layer 310 includes one or more nodes (e.g., neurons and/or perceptrons). Each node accepts an input and computes an output based on the input. In computing the output, the node can use one or more coefficients.

Within each machine-learning architecture 210, 220, or 230, the quantity of the layers 310 can vary depending on a complexity of a function that the machine-learning architecture 210, 220, or 230 implements. The machine-learning architecture 210, 220, or 230 can also include different types of layers 310 with nodes that perform different types of computations (e.g., execute different algorithms or activation functions). In some cases, the machine-learning architecture 210, 220, or 230 implements a deep-neural network having an input layer, an output layer, and at least one hidden layer. Other types of layers 310 include a convolutional layer, a pooling layer, a rectified linear unit layer, a loss layer, or a filter layer, for instance.

The machine-learning architectures 210, 220, and 230 also specify one or more connections 320 between the layers 310. These connections 320 can vary between the various machine-learning architectures. Example types of connections 320 include a full connection 321 or a partial connection 322, which differ in terms of a percentage of nodes that are connected between two layers 310. As an example, a first layer 311 is fully-connected 321 to a second layer 312 such that all of the nodes within both the first layer 311 and the second layer 312 are connected together. In other words, each node within the first layer 311 is connected to at least one other node within the second layer 312. As another example, the second layer 312 is partially-connected 322 to a third layer 313. In particular, a subset of nodes within the second layer 312 is connected to a subset of nodes within the third layer 313.

The connections 320 can also specify a direction or order in which the layers 310 are connected. A feedforward connection 323, for instance, propagates information in a forward direction towards the output. As an example, the feedforward connection 323 connects the first layer 311 with the second layer 312 and connects the second layer 312 with the third layer 313. In contrast, a feedback connection 324 propagates information in a backward direction to a previous layer. As an example, the feedback connection 324 connects at least one node of the third layer 313 to another node of the first layer 311. Using the feedback connection 324, the machine-learning architecture 210, 220, or 230 can implement a recurrent neural-network, such as a long short-term memory (LSTM) neural network.

Inputs and outputs of the machine-learning architecture 210, 220, or 230 can also vary depending on the function implemented. As an example, the input can include samples of a signal, such as samples of a downlink signal received at the UE 110 or samples of an uplink signal received at the base station 120.

The output can include modified samples of the signal. To implement a regression model, the machine-learning architecture 210, 220, or 230 is designed to output one or more continuous values. Alternatively, to implement a classification model, the machine-learning architecture 210, 220, or 230 is designed to output one or more discrete values.

A variety of different training techniques can be used to determine the coefficients used by the machine-learning architecture 210, 220, or 230. These training techniques include supervised learning, unsupervised learning, or reinforcement learning. Generally speaking, the network-slice manager 190 associates each machine-learning architecture 210, 220, and 230 with one or more network slices, as further described with respect to FIG. 4.

Figure 4:
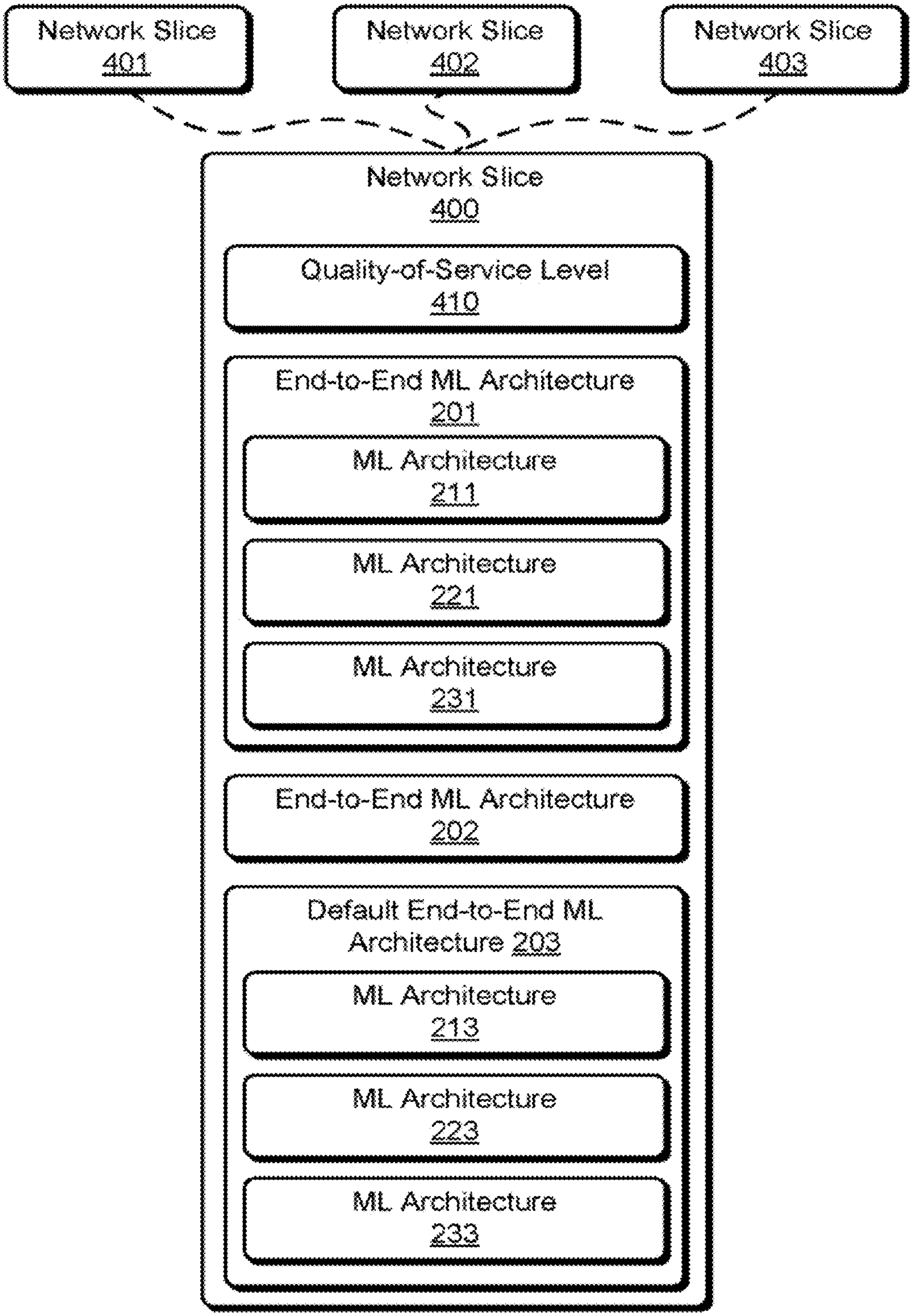
FIG. 4 illustrates example network slices created by a network-slice manager.

FIG. 4 illustrates example network slices 400 created by a network-slice manager 190. The network-slice manager 190 designs the network slice 400 to satisfy a quality-of-service level 410 associated with one or more applications. Accordingly, each network slice 400 can satisfy different quality-of-service levels 410 as specified by different applications or use cases.

Generally speaking, each application is associated with an application type and a quality-of-service class identifier (QCI). Example applications Hulu™, Netflix™, or YouTube™ can be associated with a video streaming application type and the quality-of-service identifier can include 4, 6, 8, or 9. Other example applications Skype™, Facetime™, or Google Hangouts™ can be associated with a video conferencing application type and the quality-of-service identifier can include 2 or 7. Still other example applications, such as Minecraft™ or PUBG Mobile™, can be associated with a gaming application type and the quality-of-service identifier can include 3 or 7.

In FIG. 4, the network-slice manager 190 creates a first network slice 401, a second network slice 402, and a third network slice 403. The network slices 401, 402, and 403 each provide at least one quality-of-service flow through the wireless communication network. In some situations, two or more of the network slices 401, 402, and 403 occur in parallel during an overlapping portion of time.

The network slices 401, 402, and 403 are designed to satisfy different quality-of-service levels 410, which can be associated with different use cases or applications. For example, the first network slice 401 provides low latency and is associated with ultra-reliable low-latency communication (URLLC), which may be used for factory automation, autonomous driving, or remote surgery. The second network slice 402, however, provides high throughput and is associated with enhanced mobile broadband (eMBB). As an example, the second network slice 402 services high-definition video streaming. In contrast, the third network slice 403 is designed to service a large quantity of UEs 110 to support massive machine-to-machine communication. Other types of network slices 400 can be associated with online gaming, one-way streaming, or two-way streaming (e.g., video conferencing).

The network-slice manager 190 determines at least one end-to-end machine-learning architecture 200 (of FIG. 2) that enables the network slice 400 to meet the quality-of-service level 410. The network-slice manager 190 associates (e.g., relates or maps) the determined end-to-end machine-learning architecture 200 with the network slice 400. As an example, the network-slice manager 190 associates the network-slice 400 with a first end-to-end machine-learning architecture 201, a second end-to-end machine-learning architecture 202, and a default end-to-end machine-learning architecture 203. The first end-to-end machine-learning architecture 201 includes the machine-learning architecture 211, the machine-learning architecture 221, and the machine-learning architecture 231 of FIG. 2. Although not shown, the second end-to-end machine-learning architecture 202 includes the machine-learning architecture 212, the machine-learning architecture 222, and the machine-learning architecture 232 of FIG. 2, for instance. The default end-to-end machine-learning architecture 203 includes the machine-learning architecture 213, the machine-learning architecture 223, and the machine-learning architecture 233. Other end-to-end machine-learning architectures 200 are also possible, such as an end-to-end machine-learning architecture 200 that includes the machine-learning architecture 211, the machine-learning architecture 222, and the machine-learning architecture 233.

Although the end-to-end machine-learning architectures 201, 202, and 203 can differ in terms of performance, the end-to-end machine-learning architectures 201, 202, and 203 at least enable the network slice 400 to satisfy the quality-of-service level 410. Consider an example in which the quality-of-service level 410 specifies a high-level of reliability. The default end-to-end machine-learning architecture 203 can provide a beginning level of performance, such as a medium-level of latency, a medium-level of throughput, and the high-level of reliability. Performance of the end-to-end machine-learning architecture 201 and 202 may be similar to or better than the default end-to-end machine-learning architecture 203. For example, the first end-to-end machine-learning architecture 201 provides a low-level of latency instead of the medium-level of latency, and similarly provides the medium-level of throughput and the high-level of reliability. In contrast, the second end-to-end machine-learning architecture 202 provides a high-level of throughput instead of the medium-level of throughput, and similarly provides the medium-level of latency and the high-level of reliability.

In some implementations, the network-slice manager 190 determines the relationship between different network slices 400 and different end-to-end machine-learning architectures 200 offline. The network-slice manager 190 stores information that describes this relationship for later reference. As an example, the network-slice manager 190 can store one or more lists or tables that map each network slice 400 to one or more end-to-end machine-learning architectures 200. By association, this relationship mapping also extends to individual machine-learning architectures 210, 220, and 230, which form the end-to-end machine-learning architectures 200.

Associating a network slice 400 with more than one end-to-end machine-learning architecture 200 enables the network slice 400 to be implemented for a variety of entities having different capabilities. These entities include different UEs 110, different base stations 120, or different entities of the 5GC 150. For example, a first UE 111 with limited computational capability can operate with machine-learning architecture 211 but not machine-learning architecture 212. As such, the first end-to-end machine-learning architecture 201, instead of the end-to-end machine-learning architecture 202, can be activated by the network-slice manager 190 to satisfy the quality-of-service level 410 associated with the network slice 400. In another example, a second UE 112 with limited available power can operate with the machine-learning architecture 212 but not the machine-learning architecture 211. As such, the second end-to-end machine-learning architecture 202, instead of the end-to-end machine-learning architecture 201, can be activated by the network-slice manager 190 to similarly satisfy the quality-of-service level 410 associated with the network slice 400. Selection of the end-to-end machine-learning architecture 200, and more specifically the machine-learning architecture 210, is further described with respect to FIG. 8.

Example Devices

Figure 5:
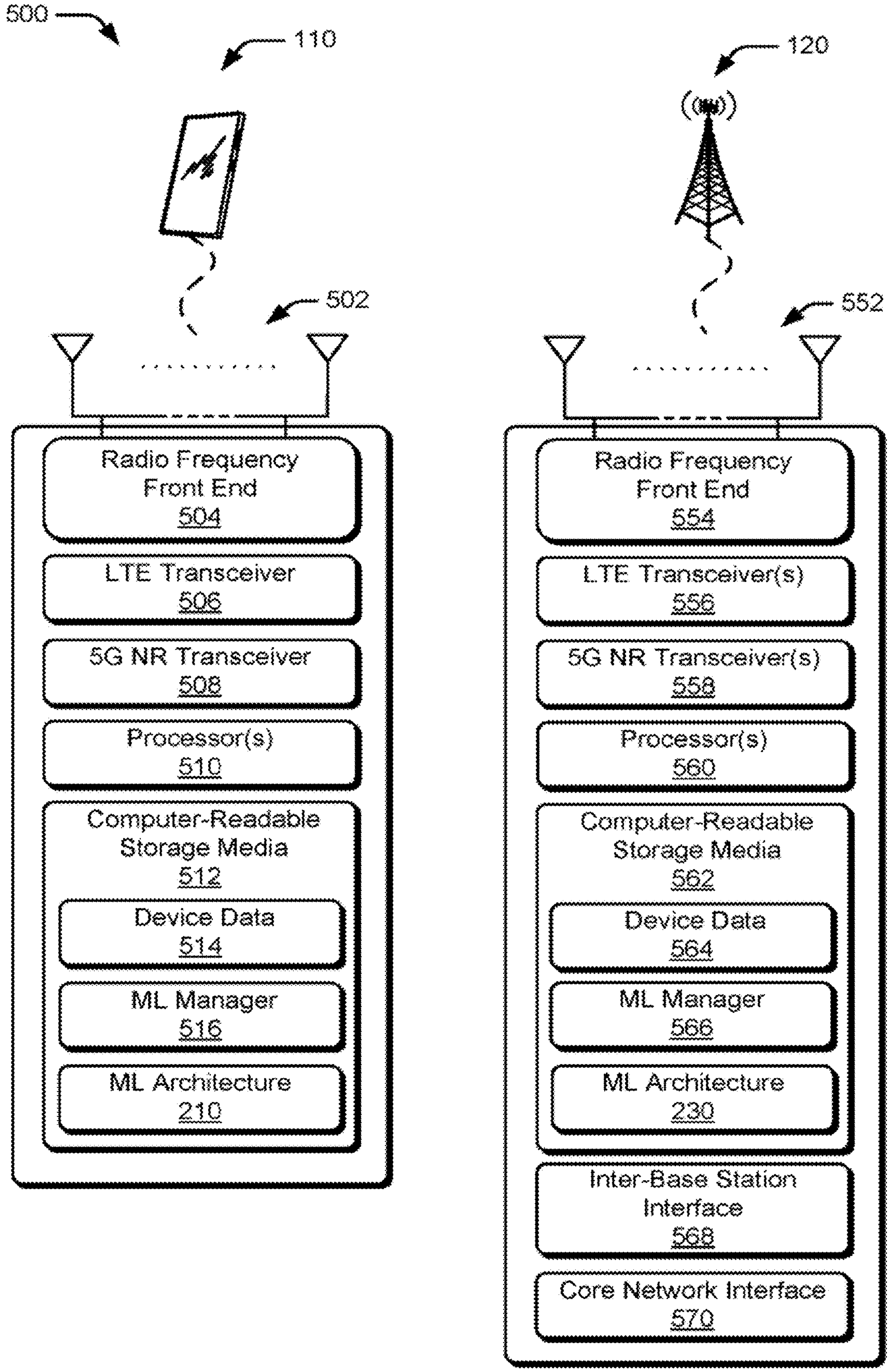
FIG. 5 illustrates example device diagrams of a user equipment and a base station for determining a machine-learning architecture for network slicing.

FIG. 5 illustrates an example device diagram 500 of the UE 110 and the base station 120. The UE 110 and the base station 120 may include additional functions and interfaces that are omitted from FIG. 5 for the sake of clarity. The UE 110 includes antennas 502, a radio-frequency (RF) front end 504 (RF front end 504), an LTE transceiver 506, and a 5G NR transceiver 508 for communicating with base stations 120 in the 5G RAN 141 and/or the E-UTRAN 142. The RF front end 504 of the UE 110 can couple or connect the LTE transceiver 506 and the 5G NR transceiver 508 to the antennas 502 to facilitate various types of wireless communication. The antennas 502 of the UE 110 may include an array of multiple antennas that are configured similar to or different from each other. The antennas 502 and the RF front end 504 can be tuned to, and/or be tunable to, one or more frequency bands defined by the 3GPP LTE and 5G NR communication standards and implemented by the LTE transceiver 506, and/or the 5G NR transceiver 508. Additionally, the antennas 502, the RF front end 504, the LTE transceiver 506, and/or the 5G NR transceiver 508 may be configured to support beamforming (e.g., analog or digital), duplex operation (e.g., full-duplex or half-duplex operation), or in-phase and quadrature (I/Q) operations (e.g., I/Q modulation or demodulation operations) for the transmission and reception of communications with the base stations 120. By way of example and not limitation, the antennas 502 and the RF front end 504 can be implemented for operation in sub-gigahertz bands, sub-6 GHZ bands, and/or bands with frequencies between approximately 6 and 500 GHz that are defined by the 3GPP LTE and 5G NR communication standards. In some cases, the antennas 502 and the RF front end 504 can be implemented for operation in the extremely-high frequency spectrum (e.g., for frequencies that are between approximately 54 and 500 GHz).

The UE 110 also includes processor(s) 510 and computer-readable storage media 512 (CRM 512). The processor 510 may be a single-core processor or a multi-core processor composed of a variety of materials, such as silicon, polysilicon, high-K dielectric, copper, and so on. The computer-readable storage media described herein excludes propagating signals. CRM 512 may include any suitable memory or storage device such as random-access memory (RAM), static RAM (SRAM), dynamic RAM (DRAM), non-volatile RAM (NVRAM), read-only memory (ROM), or Flash memory useable to store device data 514 of the UE 110. The device data 514 includes user data, multimedia data, beamforming codebooks, applications, and/or an operating system of the UE 110, which are executable by processor(s) 510 to enable user-plane communication, control-plane signaling, and user interaction with the UE 110.

CRM 512 also includes, or stores instructions relating to, a machine-learning manager 516. Alternatively or additionally, the machine-learning manager 516 may be implemented in whole or part as hardware logic or circuitry integrated with or separate from other components of the UE 110. In at least some aspects, the machine-learning manager 516 configures the LTE transceiver 506 or the 5G NR transceiver 508 for communication with the base station 120. In this way, the machine-learning manager 516 can send a message to the network-slice manager 190 through the base station 120 or receive a message from the network-slice manager 190 through the base station 120, as further described with respect to FIG. 8.

CRM 512 additionally includes at least one machine-learning architecture 210 (of FIG. 2), which can be implemented based on the UE 110's capabilities. The machine-learning manager 516 selects a machine-learning architecture 210 based on one or more quality-of-service levels associated with an application, as further described with respect to FIG. 8. The machine-learning manager 516 can also initiate a training procedure to determine coefficients, which are applied to enable wireless communication using the machine-learning architecture 210.

The device diagram for the base station 120, shown in FIG. 5, includes a single network node (e.g., a gNode B). The functionality of the base station 120 may be distributed across multiple network nodes or devices and may be distributed in any fashion suitable to perform the functions described herein. The base station 120 includes antennas 552, a radio-frequency (RF) front end 554 (RF front end 554), one or more LTE transceivers 556, and/or one or more 5G NR transceivers 558 for communicating with the UE 110. The RF front end 554 of the base stations 120 can couple or connect the LTE transceivers 556 and the 5G NR transceivers 558 to the antennas 552 to facilitate various types of wireless communication. The antennas 552 of the base station 120 may include an array of multiple antennas that are configured similar to or different from each other. The antennas 552 and the RF front end 554 can be tuned to, and/or be tunable to, one or more frequency band defined by the 3GPP LTE and 5G NR communication standards, and implemented by the LTE transceivers 556, and/or the 5G NR transceivers 558. Additionally, the antennas 552, the RF front end 554, the LTE transceivers 556, and/or the 5G NR transceivers 558 may be configured to support beamforming, such as Massive-MIMO, for the transmission and reception of communications with the UE 110.

The base stations 120 also include processor(s) 560 and computer-readable storage media 562 (CRM 562). The processor 560 may be a single-core processor or a multi-core processor composed of a variety of materials, such as silicon, polysilicon, high-K dielectric, copper, and so on. CRM 562 may include any suitable memory or storage device such as random-access memory (RAM), static RAM (SRAM), dynamic RAM (DRAM), non-volatile RAM (NVRAM), read-only memory (ROM), or Flash memory useable to store device data 564 of the base stations 120. The device data 564 includes network scheduling data, radio resource management data, beamforming codebooks, applications, and/or an operating system of the base stations 120, which are executable by processor(s) 560 to enable communication with the UE 110.

CRM 562 also includes, or stores instructions relating to, a machine-learning (ML) manager 566. Alternatively or additionally, the machine-learning manager 566 may be implemented in whole or part as hardware logic or circuitry integrated with or separate from other components of the base stations 120. In at least some aspects, the machine-learning manager 566 configures the LTE transceivers 556 and the 5G NR transceivers 558 for communication with the UE 110. In this manner, the machine-learning manager 566 can forward messages from the UE 110 to the network-slice manager 190 or forward messages from the network-slice manager 190 to the UE 110, as further described with respect to FIG. 8.

CRM 562 additionally includes at least one machine-learning architecture 220 (of FIG. 2), which can be implemented based on the base station 120's capabilities. In some implementation, the machine-learning manager 566 selects a machine-learning architecture 220 based on an available end-to-end machine-learning architecture 200 associated with the network slice 400, as further described with respect to FIG. 8. The machine-learning manager 566 can also initiate a training procedure or provide coefficients to the machine-learning architecture 220.

The base stations 120 include an inter-base station interface 568, such as an Xn and/or X2 interface, which a base station manager (not shown) configures to exchange user-plane and control-plane data between another base station 120, to manage the communication of the base stations 120 with the UE 110. The base station 120 also includes a core network interface 570 that the machine-learning manager 566 configures to exchange information with core network functions and entities, such as the network-slice manager 190. In this manner, the machine-learning manager 566 can provide information to or obtain information from the network-slice manager 190. Together, the network-slice manager, the machine-learning manager 516 of the UE 110, and the machine-learning manager 566 of the base station 120 can at least partially determine a machine-learning architecture for network slicing as described herein. The network-slice manager 190 is further described with respect to FIG. 3.

Figure 6:
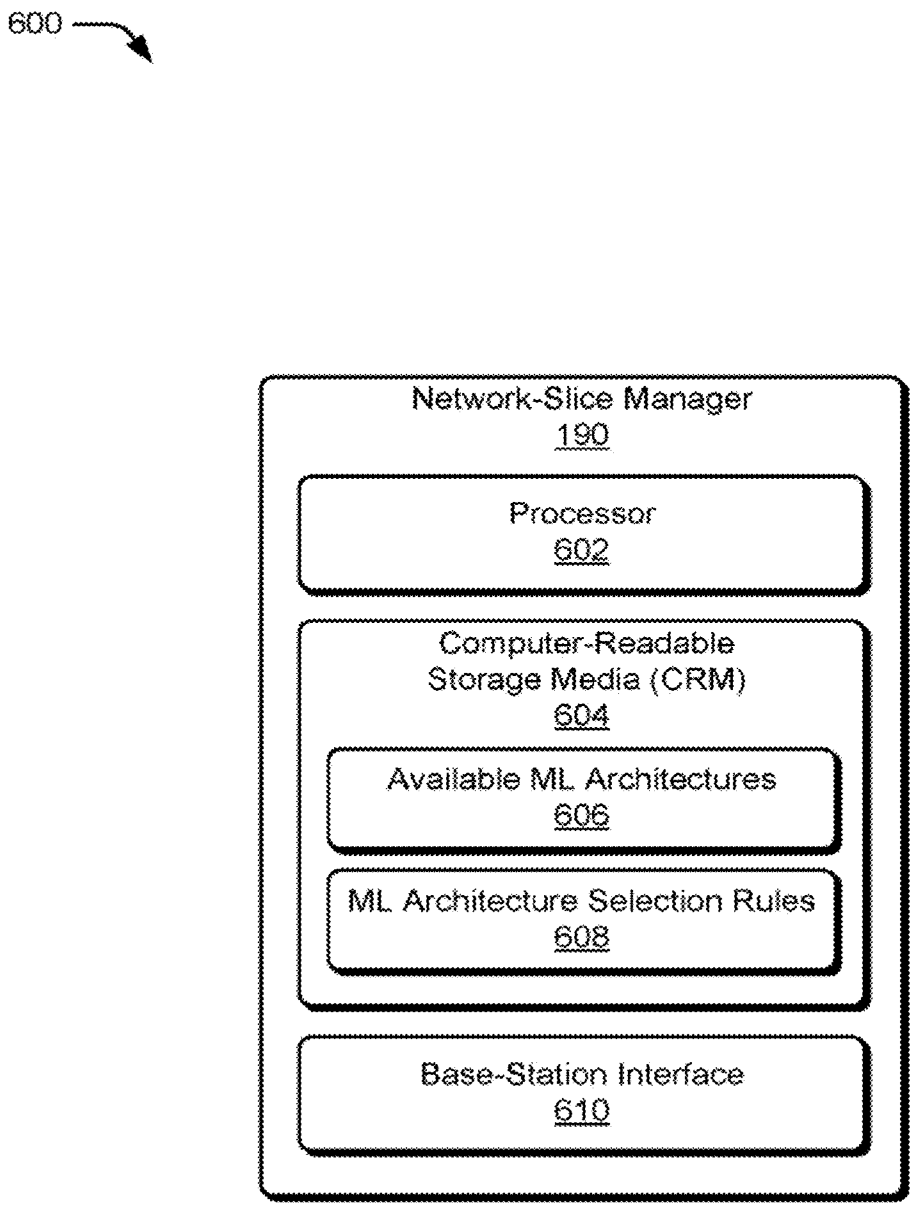
FIG. 6 illustrates an example device diagram of a network-slice manager for determining a machine-learning architecture for network slicing.

FIG. 6 illustrates an example device diagram 600 of the network-slice manager 190 for determining a machine-learning architecture for network slicing. In the depicted configuration, the network-slice manager 190 includes a processor 602 and computer-readable storage media (CRM) 604. Similar to CRM 512 and CRM 562, CRM 604 may include any suitable memory or storage device such as random-access memory (RAM), static RAM (SRAM), dynamic RAM (DRAM), non-volatile RAM (NVRAM), read-only memory (ROM), or Flash memory.

The CRM 604 stores one or more available machine-learning architectures 606 associated with at least one network slice 400. The available machine-learning architectures 606 specify end-to-end machine-learning architectures 200 and/or individual machine-learning architectures (e.g., machine-learning architectures 210, machine-learning architectures 220, and/or machine-learning architectures 230) that satisfy the quality-of-service level 410 of the network slice 400.

The CRM 604 also stores the machine-learning architecture selection rules 608. The machine-learning architecture selection rules 608 provide instructions enabling the UE 110 to select an appropriate machine-learning architecture 210 based on the application executed by the UE 110. In some cases, the machine-learning architecture selection rules 608 include instructions that enable the UE 110 to derive a requested quality-of-service level from given performance requirements of the application. The machine-learning architecture selection rules 608 can also include instructions enabling the UE 110, the base station 120, or the entity of the 5GC 150 to select an appropriate machine-learning architecture based on the available machine-learning architectures 606.

The network-slice manager 190 can also include a base-station interface 610, which the network-slice manager 190 configures to exchange information with the base station 120. In this manner, the network-slice manager 190 can directly provide information to or obtain information from the base station 120.

User Plane and Control Plane Signaling

Figure 7:
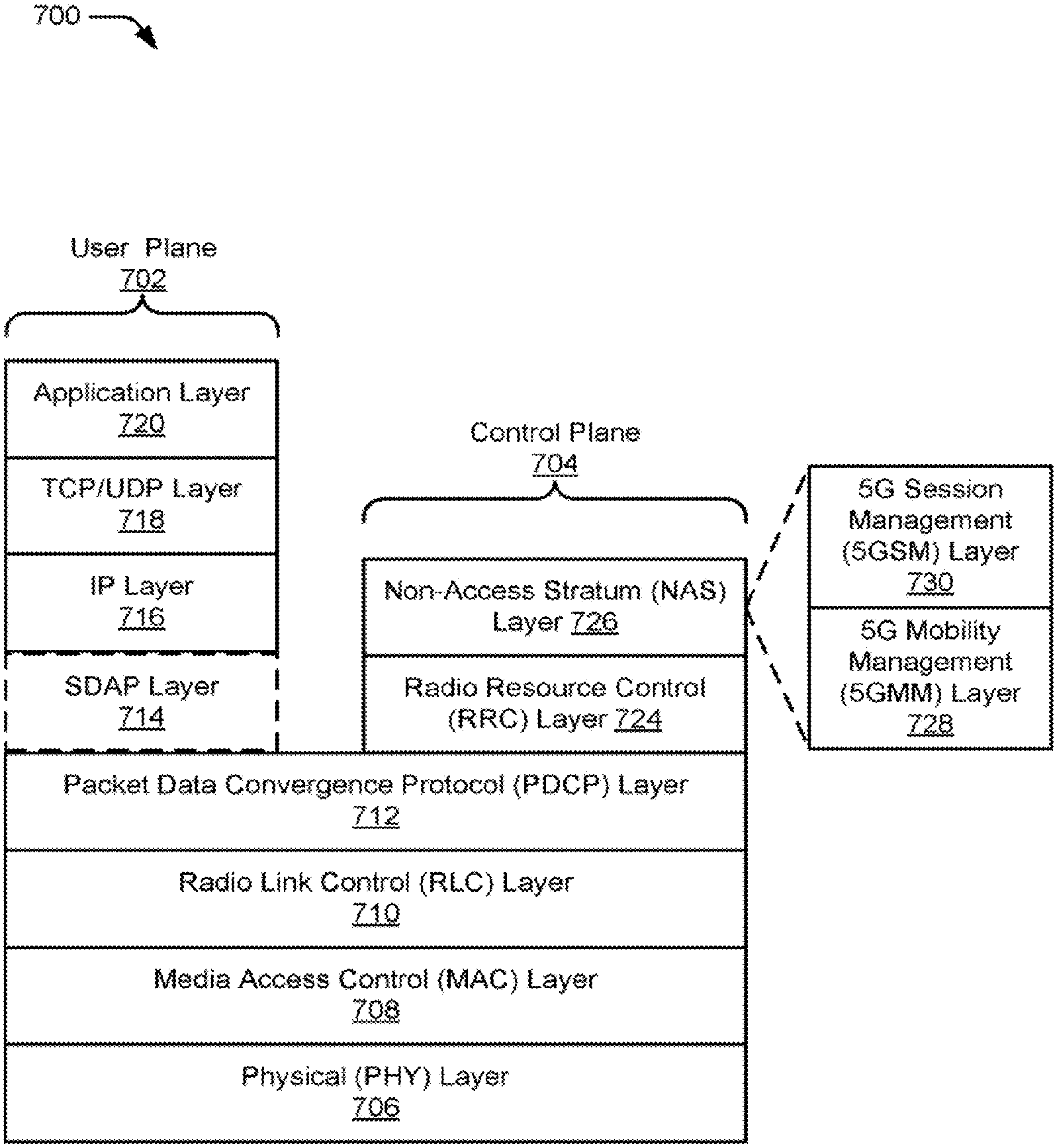
FIG. 7 illustrates an example block diagram of a wireless network stack model in which various aspects of determining a machine-learning architecture for network slicing can be implemented.

FIG. 7 illustrates an example block diagram 700 of a wireless network stack model 700 (stack 700). The stack 700 characterizes a communication system for the example environment 100, in which various aspects of determining a machine-learning architecture for network slicing can be implemented. The stack 700 includes a user plane 702 and a control plane 704. Upper layers of the user plane 702 and the control plane 704 share common lower layers in the stack 700. Wireless devices, such as the UE 110 or the base station 120, implement each layer as an entity for communication with another device using the protocols defined for the layer. For example, the UE 110 uses a Packet Data Convergence Protocol (PDCP) entity to communicate to a peer PDCP entity in a base station 120 using the PDCP.

The shared lower layers include a physical (PHY) layer 706, a Media Access Control (MAC) layer 708, a Radio Link Control (RLC) layer 710, and a PDCP layer 712. The PHY layer 706 provides hardware specifications for devices that communicate with each other. As such, the PHY layer 706 establishes how devices connect to each other, assists in managing how communication resources are shared among devices, and the like.

The MAC layer 708 specifies how data is transferred between devices. Generally, the MAC layer 708 provides a way in which data packets being transmitted are encoded and decoded into bits as part of a transmission protocol.

The RLC layer 710 provides data transfer services to higher layers in the stack 700. Generally, the RLC layer 710 provides error correction, packet segmentation and reassembly, and management of data transfers in various modes, such as acknowledged, unacknowledged, or transparent modes.

The PDCP layer 712 provides data transfer services to higher layers in the stack 700. Generally, the PDCP layer 712 provides transfer of user plane 702 and control plane 704 data, header compression, ciphering, and integrity protection.

Above the PDCP layer 712, the stack splits into the user-plane 702 and the control-plane 704. Layers of the user plane 702 include an optional Service Data Adaptation Protocol (SDAP) layer 714, an Internet Protocol (IP) layer 716, a Transmission Control Protocol/User Datagram Protocol (TCP/UDP) layer 718, and an application layer 720, which transfers data using the wireless link 106. The optional SDAP layer 714 is present in 5G NR networks. The SDAP layer 714 maps a quality-of-service flow for each data radio bearer and marks quality-of-service flow identifiers in uplink and downlink data packets for each packet data session. The IP layer 716 specifies how the data from the application layer 720 is transferred to a destination node. The TCP/UDP layer 718 is used to verify that data packets intended to be transferred to the destination node reached the destination node, using either TCP or UDP for data transfers by the application layer 720. In some implementations, the user plane 702 may also include a data services layer (not shown) that provides data transport services to transport application data, such as IP packets including web-browsing content, video content, image content, audio content, or social media content.

The control plane 704 includes a Radio Resource Control (RRC) layer 724 and a Non-Access Stratum (NAS) layer 726. The RRC layer 724 establishes and releases connections and radio bearers, broadcasts system information, or performs power control. The RRC layer 724 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 724 supports 7GPP access but does not support non-3GPP access (e.g., WLAN communications).

The NAS layer 726 provides support for mobility management (e.g., using a 5th-Generation Mobility Management (5GMM) layer 728) and packet data bearer contexts (e.g., using a 5th-Generation Session Management (5GSM) layer 730) between the UE 110 and entities or functions in the core network, such as the AMF 152 of the 5GC 150 or the like. The NAS layer 726 supports both 3GPP access and non-3GPP access.

In the UE 110, each layer in both the user plane 702 and the control plane 704 of the stack 700 interacts with a corresponding peer layer or entity in the base station 120, a core network entity or function, and/or a remote service, to support user applications and control operation of the UE 110 in the RAN 140.

Determining a Machine-Learning Architecture for Network Slicing

Figure 8:
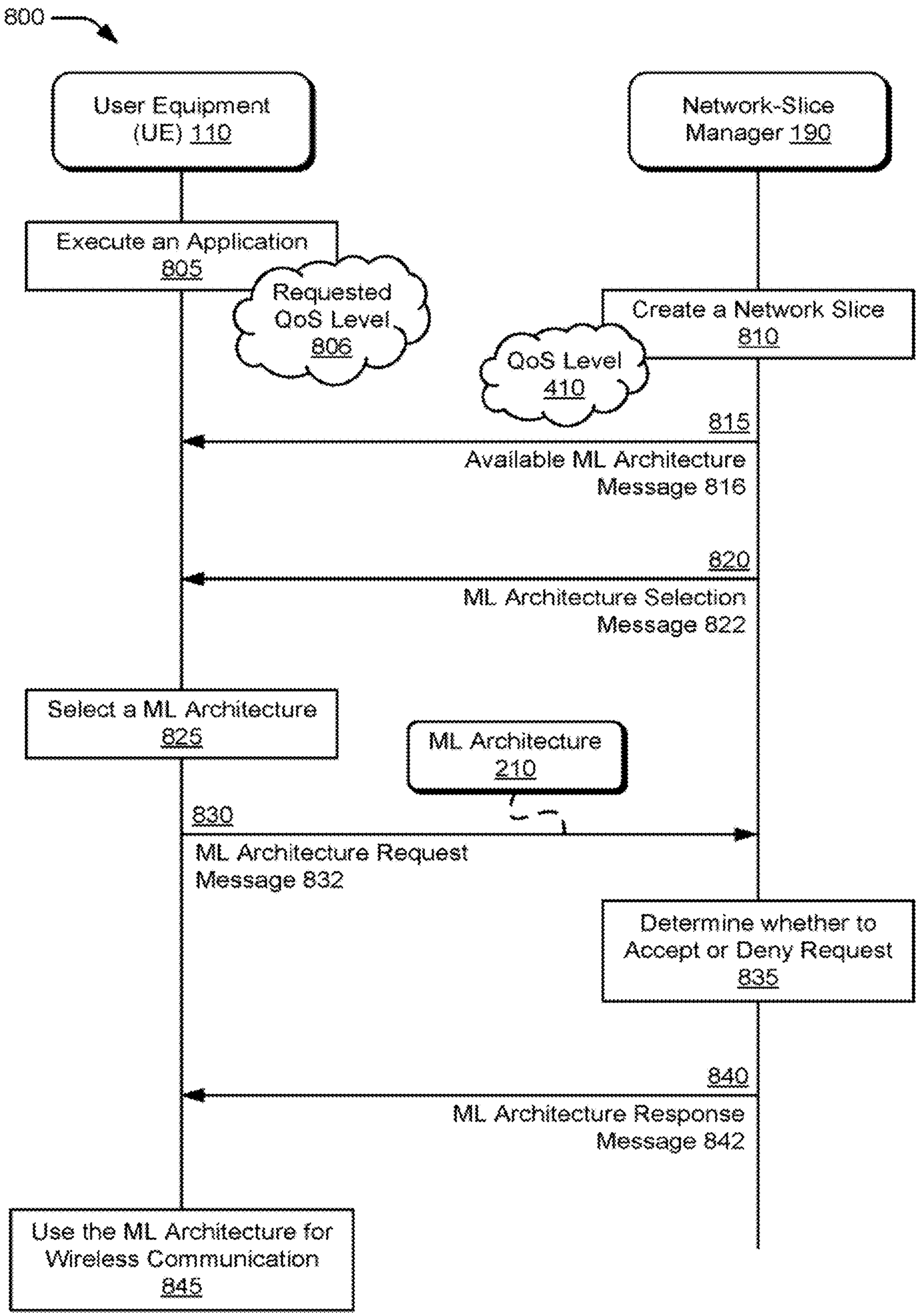
FIG. 8 illustrates example messaging transactions between a user equipment and a network-slice manager for determining a machine-learning architecture for network slicing.

FIG. 8 illustrates example messaging transactions 800 between the UE 110 and the network-slice manager 190 for determining a machine-learning architecture 210 for network slicing. Although not shown, the base station 120 can assist with forwarding messages from the network-slice manager 190 to the UE 110, or assist with forwarding messages from the UE 110 to the network-slice manager 190.

At 805, the UE 110 executes an application, such as any of the applications described above. In general, the application relies on the UE's 110 ability to wirelessly communicate data. The application is associated with a requested quality-of-service level 806.

At 810, the network-slice manager 190 creates a network slice 400 that supports the quality-of-service level 410. The quality-of-service level 410 satisfies the requested quality-of-service level 806 associated with the application, as described above with respect to FIG. 4. In some cases, the network-slice manager 190 receives an indication, from the UE 110, of the requested quality-of-service level 806, such as an index (5QI). Based on the indication, the network-slice manager 190 can select an appropriate network slice 400.

At 815, the network-slice manager 190 transmits an available machine-learning architecture message 816 to the UE 110. The available machine-learning architecture message 816 identifies available machine-learning architectures 606 (e.g., available machine-learning architectures 210) that form a portion of available end-to-end machine-learning architectures 200 associated with the network slice 400, as described above with respect to FIG. 6. By sharing this information with the UE 110, the network-slice manager 190 and the UE 110 can efficiently determine an appropriate machine-learning architecture 210 that satisfies the requested quality-of-service level 806 of the application and forms a portion of an end-to-end machine-learning architecture 200 (e.g., the machine-learning architecture 210 of FIGS. 2 and 3) that meets the requested quality-of-service level 806. The available machine-learning architecture message 816 can be implemented as a NAS message.

In the above example, the available machine-learning architecture message 816 is transmitted after the network slice 400 is created. Alternatively, the network-slice manager 190 transmits the available machine-learning architecture message 816 prior to creating the network slice 400. In this case, the available machine-learning architecture message 816 identifies available machine-learning architectures 606 associated with multiple network slices 400 (e.g., network slices 401, 402, and 403 of FIG. 4).

At 820, the network-slice manager 190 transmits a machine-learning architecture selection message 822 to the UE 110. The machine-learning architecture selection message 822 includes the machine-learning architecture selection rules 608 (of FIG. 6), which enable the UE 110 to select a machine-learning architecture (e.g., select one of the machine-learning architectures 210 of FIG. 2) based on the application. Similar to the available machine-learning architecture message 816, the machine-learning architecture selection message 822 can also be implemented as a NAS message. Generally speaking, steps 815 and 820 can each occur any time prior to 825 or in response to the network-slice manager 190 rejecting the UE 110's request to use a particular machine-learning architecture 210, as further described below.

At 825, the UE 110 selects a machine-learning architecture 210 based on the requested quality-of-service level 806. The UE 110 can select the machine-learning architecture 210 from a set of possible machine-learning architectures that the UE 110 can implement based on its current capabilities. In some cases, the UE 110 applies the machine-learning architecture selection rules 608 to derive the requested quality-of-service level 806 from performance requirements of the application and select an appropriate machine-learning architecture 210. In other cases, the UE 110 applies the machine-learning architecture selection rules 608 to select the machine-learning architecture 210 from the available machine-learning architectures 606.

At 830, the UE 110 transmits a machine-learning architecture request message 832 to the network-slice manager 190 to request permission to use the selected machine-learning architecture 210 (of FIGS. 2 and 3).

At 835, the network-slice manager 190 determines whether or not to accept or deny the request. In particular, the network-slice manager 190 determines whether the selected machine-learning architecture 210 is associated with one of the end-to-end machine-learning architectures 200 of the network slice 400. For example, the network-slice manager 190 determines whether or not one of the available end-to-end machine-learning architectures 200 associated with the network slice 400 can be formed using the selected machine-learning architecture 210.

At 840, the network-slice manager 190 transmits a machine-learning architecture response message 842 to the UE 110 to grant or not grant permission to use the selected machine-learning architecture 210. If the network-slice manager 190 determines that the selected machine-learning architecture 210 is not associated with any of the available end-to-end machine-learning architectures 200 associated with the network slice 400, the machine-learning architecture response message 842 does not grant the UE 110 permission to use the selected machine-learning architecture 210. Sometimes, the network-slice manager 190 transmits the available machine-learning architecture message 816 and/or the machine-learning architecture selection message 822 responsive to denying the UE 110's request (not shown).

If permission is not granted, the UE 110 can select a machine-learning architecture associated with the default end-to-end machine-learning architecture 203 (e.g., the machine-learning architecture 213 of FIG. 2) and use the machine-learning architecture 213 to wirelessly communicate data for the application. Alternatively, the process can repeat at 825 such that the UE 110 selects a second machine-learning architecture 210.

Alternatively, if the network-slice manager 190 determines that the selected machine-learning architecture 210 can be used to form one of the end-to-end machine-learning architectures 200 associated with the network slice 400, the machine-learning architecture response message 842 grants the UE 110 permission to use the selected machine-learning architecture 210.

If permission is granted, the UE 110 uses the selected machine-learning architecture 210 to wirelessly communicate data for the application. For example, the UE 110 uses the selected machine-learning architecture 210 to wirelessly communicate with the base station 120.

After granting the UE 110 permission to use the selected machine-learning architecture 210, the network-slice manager 190 can select an available end-to-end machine-learning architecture 200 that includes the selected machine-learning architecture 210. Based on the selected end-to-end machine-learning architecture 200, the network-slice manager 190 can direct the base station 120 and/or the entity of the 5GC 150 to respectively use the machine-learning architecture 220 and the machine-learning architecture 230 associated with the selected end-to-end machine-learning architecture 200.

In some situations, the UE 110 can execute multiple applications in parallel, and the network-slice manager 190 can create multiple network slices 400 to service one or more UEs 110. Accordingly, the process can repeat at 805 to allow the UE 110 (or another UE 110) to execute a second application and the network-slice manager 190 to create a second network slice 400 or provide another quality-of-service flow using the first network slice 400.

Sometimes the available end-to-end machine-learning architectures 200 that satisfy the quality-of-service level 410 change if the UE 110 connects to a different base station 120 or a different entity of the 5GC 150. This change can occur if the current base station 120 or the current entity has different capabilities compared to a previous base station or a previous entity of the 5GC 150. Due to the different capabilities, a first set of machine-learning architectures 220, which the current base station 120 can implement, differs from a second set of machine-learning architectures 220, which the previous base station can implement. Similarity, a first set of machine-learning architectures 230, which the current entity can implement, can differ from a second set of machine-learning architectures 230, which the previous entity can implement. As such, the available machine-learning architectures 606 can be dependent upon the end-to-end machine-learning architectures 200 that can be realized using the machine-learning architectures 220 supported by the current base station 120 and the machine-learning architectures 230 supported by the current entity.

Changes to the available machine-learning architectures 606 can occur responsive to a variety of different situations. For example, these changes can occur if the UE 110 moves to a different location or tracking area. In another example, these changes occur if the UE 110 roams between a home network (e.g., a network that the UE 110 is registered with) and a visited network (e.g., a network that the UE 110 is not registered with). The network-slice manager 190 can transmit a second available machine-learning architecture message 816 to inform the UE 110 of the latest available machine-learning architectures 606 associated with the network slice 400.

Consider an example in which the base station 121 is capable of implementing the machine-learning architecture 221. In this example, the UE 110 switches from communicating with the base station 121 to communicating with the base station 122. Capabilities of the base station 122, however, do not enable the base station 122 to implement the machine-learning architecture 221. As such, the end-to-end machine-learning architecture 201 (of FIG. 2) is no longer a viable option for meeting the quality-of-service level 410 of the network slice 400. By association, the machine-learning architecture 211 is also no longer available either. The network-slice manager 190 transmits the available machine-learning architecture message 816 to inform the UE 110 of an update to the available machine-learning architectures 606. Based on this update, the UE 110 selects the machine-learning architecture 212 associated with the end-to-end machine-learning architecture 202. In this case, the machine-learning architecture 212 enables the requested quality-of-service level 806 to be satisfied with the implementation of the end-to-end machine-learning architecture 202.

In some cases, the selection process at 825 occurs responsive to the UE 110 performing a tracking-area update (TAU) procedure. The TAU procedure informs the wireless network of which tracking area corresponds with the UE 110's current location.

Although described with respect to the UE 110, similar operations can occur between the network-slice manager 190 and other entities within the wireless communication network, such as the base station 120 or the entity of the 5GC 150. In these cases, the entity and the network-slice manager 190 determine an appropriate machine-learning architecture based on capabilities of the entity, the requested quality-of-service level 806, and the available end-to-end machine-learning architectures 200.

Example Methods

Figure 9:
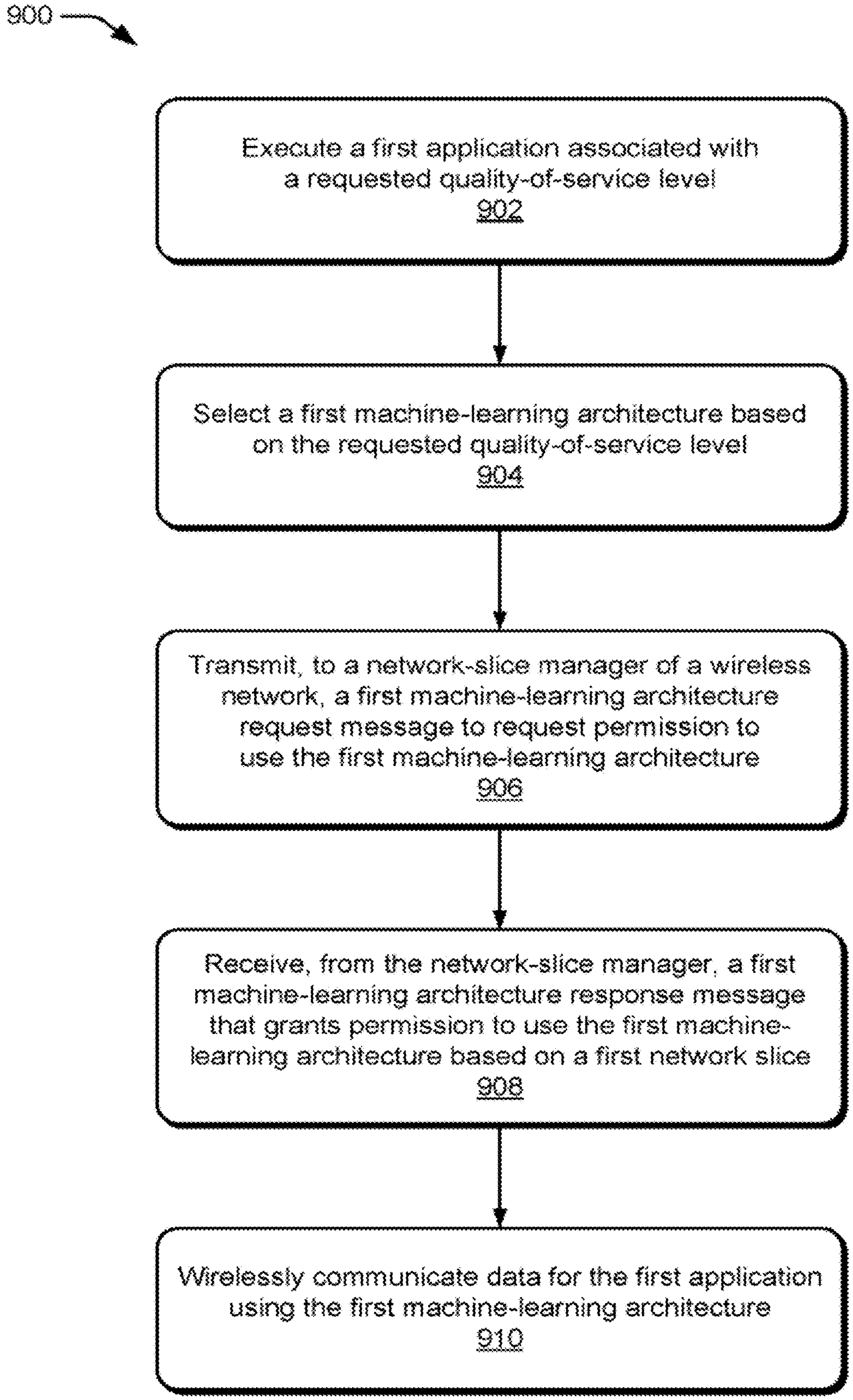
FIG. 9 illustrates an example method performed by a user equipment for determining a machine-learning architecture for network slicing.

FIG. 9 depicts an example method 900 performed by the UE 110 for determining a machine-learning architecture for network slicing. Method 900 is shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environment 100 of FIG. 1 and entities detailed in FIG. 2, reference to which is made for example only. The techniques are not limited to performance by one entity or multiple entities operating on one device.

At 902, the UE executes a first application associated with a requested quality-of-service level. For example, the UE 110 executes the first application associated with the requested quality-of-service level 806, as described above at 805 in FIG. 8.

At 904, the UE selects a first machine-learning architecture based on the requested quality-of-service level. For example, the UE 110 selects the machine-learning architecture 210 based on the requested quality-of-service level 806. The machine-learning architecture 210 can be one of the machine-learning architectures 210 that the UE 110 is able to implement, such as one of the machine-learning architectures 211, 212, or 213 of FIG. 2.

At 906, the UE transmits, to a network-slice manager of a wireless network, a first machine-learning architecture request message to request permission to use the first machine-learning architecture. For example, the UE 110 transmits, to the network-slice manager 190, the machine-learning architecture request message 832 to request permission to use the machine-learning architecture 210.

In response to receiving the machine-learning architecture request message 832, the network-slice manager 190 determines whether or not the machine-learning architecture 210 requested by the UE 110 is associated with at least one end-to-end machine-learning architecture 200 of a network slice 400, such as one of the end-to-end machine-learning architectures 201, 202, or 203 of FIG. 4. Consider an example in which the end-to-end machine-learning architectures 201, 202, and 203 include machine-learning architectures 211, 212, and 213, respectively. In this case, the network-slice manager 190 grants the UE 110 permission to use the machine-learning architecture 210 if the machine-learning architecture 210 is one of the machine-learning architectures 211, 212, or 213 associated with the network slice 400. However, if the machine-learning architecture 210 is not associated with any of the machine-learning architectures 211, 212, and 213, then the network-slice manager 190 does not grant the UE 110 permission to use the machine-learning architecture 210. The network-slice manager 190 sends a machine-learning architecture response message 842 to the UE 110 to communicate whether or not permission is granted.

At 908, the UE receives, from the network-slice manager, a first machine-learning architecture response message that grants permission to use the first machine-learning architecture based on a first network slice. For example, the UE 110 receives, from the network-slice manager 190, the machine-learning architecture response message 842, as shown at 840 in FIG. 8. In this example, the machine-learning architecture response message 842 grants the UE 110 permission to use the machine-learning architecture 210 based on the network slice 400 (e.g., based on the machine-learning architecture 210 forming part of one or more of the end-to-end machine-learning architectures 200 associated with the network slice 400). In other examples, the machine-learning architecture response message 842 does not grant the UE 110 permission to use the machine-learning architecture 210.

At 910, the UE wirelessly communicates data for the first application using the first machine-learning architecture. For example, the UE 110 wirelessly communicates data for the first application using the machine-learning architecture 210. The machine-learning architecture can perform channel encoding, channel decoding, modulation, demodulation, encryption, or decryption, for instance.

Figure 10:
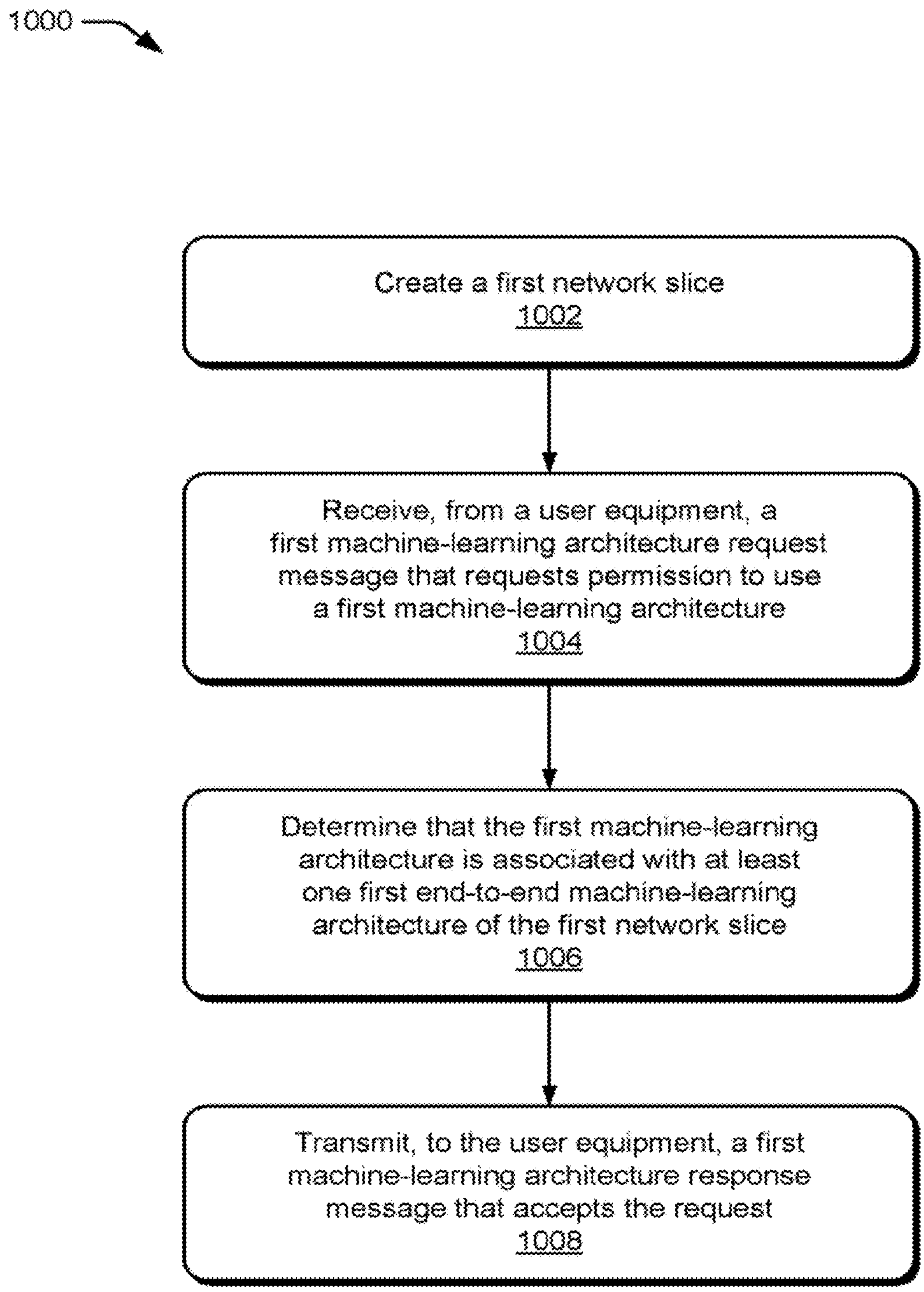
FIG. 10 illustrates an example method performed by a network-slice manager for determining a machine-learning architecture for network slicing.

FIG. 10 depicts an example method 1000 performed by the network-slice manager 190 for determining a machine-learning architecture for network slicing. Method 1000 is shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environment 100 of FIG. 1 and entities detailed in FIG. 3, reference to which is made for example only. The techniques are not limited to performance by one entity or multiple entities operating on one device.

At 1002, the network-slice manager creates a first network slice. For example, the network-slice manager 190 creates the network slice 400 at 810 in FIG. 8.

At 1004, the network-slice manager receives, from a UE, a first machine-learning architecture request message that requests permission to use a first machine-learning architecture. For example, the network-slice manager 190 receives, from the UE 110, the machine-learning architecture request message 832, as shown at 830 in FIG. 8. The machine-learning architecture request message 832 requests permission for the UE 110 to use the machine-learning architecture 210.

At 1006, the network-slice manager determines that the first machine-learning architecture is associated with at least one first end-to-end machine-learning architecture of the first network slice. For example, the network-slice manager 190 determines that the machine-learning architecture 210 is associated with at least one of the end-to-end machine-learning architectures 200 of the network slice 400, as described above at 835 in FIG. 8.

At 1008, the network-slice manager transmits, to the UE, a first machine-learning architecture response message that grants permission to use the first machine-learning architecture the request based on the determination. For example, the network-slice manager 190 transmits, to the UE 110, the machine-learning architecture response message 842 at 840 in FIG. 8. In this example, the machine-learning architecture response message 842 grants the UE 110 permission to use the machine-learning architecture 210. The network-slice manager 190 can also direct the base station 120 or the entity of the 5GC to use a machine-learning architecture associated with an end-to-end machine-learning architecture 200 that includes the machine-learning architecture 210. In another example, the machine-learning architecture response message 842 does not grant the UE 110 permission to use the machine-learning architecture 210.

By working together, the UE 110 and the network-slice manager 190 can determine an appropriate machine-learning architecture 210 that satisfies the requested quality-of-service level 806 associated with the application and forms a portion of an end-to-end machine-learning architecture 200 that meets the requested quality-of-service level 806.

CONCLUSION

Although techniques for determining a machine-learning architecture for network slicing have been described in language specific to features and/or methods, it is to be understood that the subject of the appended claims is not necessarily limited to the specific features or methods described. Rather, the specific features and methods are disclosed as example implementations determining a machine-learning architecture for network slicing.

Some examples are described below.

Example 1: A method performed by a user equipment, the method comprising the user equipment:

executing a first application associated with a first requested quality-of-service level;

selecting a first machine-learning architecture based on the first requested quality-of-service level;

transmitting, to a network-slice manager of a wireless network, a first machine-learning architecture request message to request permission to use the first machine-learning architecture;

receiving, from the network-slice manager, a first machine-learning architecture response message that grants permission to use the first machine-learning architecture based on a first network slice; and wirelessly communicating data for the first application using the first machine-learning architecture.

Example 2: The method of example 1, wherein the selecting of the first machine-learning architecture comprises:

receiving, from the network-slice manager, an available machine-learning architecture message that identifies available machine-learning architectures associated with the first network slice; and choosing the first machine-learning architecture from the available machine-learning architectures.

Example 3: The method of example 1 or example 2, wherein the selecting of the first machine-learning architecture comprises:

receiving, from the network-slice manager, a machine-learning architecture selection message that comprises one or more selection rules; and executing the one or more selection rules to determine the first machine-learning architecture.

Example 4: The method of any preceding example, further comprising:

selecting a second machine-learning architecture;

transmitting, to the network-slice manager, a second machine-learning architecture request message to request permission to use the second machine-learning architecture; and receiving, from the network-slice manager, a second machine-learning architecture response message that grants permission to use the second machine-learning architecture based on a second network slice.

Example 5: The method of example 4, further comprising:

wirelessly communicating other data for the first application using the second machine-learning architecture, wherein:

the selecting of the second machine-learning architecture is based on the first requested quality-of-service level; and the selecting of the second machine-learning architecture is responsive to at least one of the following:

the user equipment moving to a geographical location associated with a different base station or a different tracking area; or the user equipment roaming between a home network and a visited network.

Example 6: The method of any of examples 1 to 3, further comprising:

executing a second application associated with a second requested quality-of-service level;

selecting a second machine-learning architecture based on the second requested quality-of-service level;

transmitting, to the network-slice manager, a second machine-learning architecture request message to request permission to use the second machine-learning architecture; and receiving, from the network-slice manager, a second machine-learning architecture response message that grants permission to use the second machine-learning architecture based on the first network slice or a second network slice.

Example 7: The method of example 6, further comprising:

responsive to receiving the second machine-learning architecture response message, wirelessly communicating other data for the second application using the second machine-learning architecture, wherein:

the selecting of the second machine-learning architecture is based on the second requested quality-of-service level;

the executing of the second application occurs during at least an overlapping portion of time that the first application is executed; and the using of the first machine-learning architecture and the using of the second machine-learning architecture both occur during at least the overlapping portion of time.

Example 8: The method of any preceding example, further comprising:

performing a tracking-area update procedure, wherein the selecting of the second machine-learning architecture occurs responsive to the performing of the tracking-area update procedure.

Example 9: The method of any preceding example, further comprising:

executing a third application associated with a third requested quality-of-service level;

selecting a third machine-learning architecture based on the third requested quality-of-service level;

transmitting, to the network-slice manager, a third machine-learning architecture request message to request permission to use the third machine-learning architecture;

receiving, from the network-slice manager, a third machine-learning architecture response message that does not grant permission to use the third machine-learning architecture;

responsive to receiving the third machine-learning architecture response message, selecting a default machine-learning architecture;

transmitting, to the network-slice manager, a fourth machine-learning architecture request message to request permission to use the default machine-learning architecture;

receiving, from the network-slice manager, a fourth machine-learning architecture response message that grants permission to use the default machine-learning architecture based on a third network slice; and wirelessly communicating additional data for the third application using the default machine-learning architecture.

Example 10: The method of any preceding example, wherein:

the at least one first quality-of-service level includes at least one of the following:

a latency level;

a throughput level; or a reliability level.

Example 11: The method of any preceding example, wherein:

the first machine-learning architecture specifies at least one of the following:

a quantity of layers;

one or more types of layers;

an order of the one or more types of layers; or one or more types of connections between layers.

Example 12: A user equipment comprising:

a radio-frequency transceiver; and a first processor and first memory system configured to perform the method of any of examples 1-11.

Example 13: A method performed by a network-slice manager, the method comprising:

creating a first network slice;

receiving, from a user equipment, a first machine-learning architecture request message that requests permission to use a first machine-learning architecture;

determining that the first machine-learning architecture is associated with at least one first end-to-end machine-learning architecture of the first network slice; and transmitting, to the user equipment, a first machine-learning architecture response message that grants permission to use the first machine-learning architecture.

Example 14: The method of example 13, further comprising:

storing information that relates the first network slice to at least one available end-to-end machine-learning architecture, wherein the determining that the first machine-learning architecture is associated with the at least one first end-to-end machine-learning architecture comprises determining that the first machine-learning architecture forms a portion of the at least one available end-to-end machine-learning architecture.

Example 15: The method of example 14, wherein:

the at least one available machine-learning architecture comprises at least one end-to-end machine-learning architecture, the at least one end-to-end machine-learning architecture including the first user-equipment machine-learning architecture.

Example 16: The method of any of example 14 or example 15, further comprising:

transmitting, to the user equipment, an available machine-learning architecture message that identifies the at least one available end-to-end machine-learning architecture.

Example 17: The method of example 16, wherein the available machine-learning architecture message comprises a Non-Access Stratum message.

Example 18: The method of any of examples 13 to 17, further comprising:

transmitting, to the user equipment, a machine-learning architecture selection message that comprises one or more selection rules enabling the user equipment to determine the first machine-learning architecture.

Example 19: The method of any of examples 13 to 18, further comprising:

creating a second network slice;

receiving, from the user equipment, a second machine-learning architecture request message to request permission to use a second machine-learning architecture;

determining that the second machine-learning architecture is not associated with any second end-to-end machine-learning architectures of the second network slice; and transmitting, to the user equipment, a second machine-learning architecture response message that does not grant permission to use the second machine-learning architecture.

Example 20: The method of example 19, wherein the second machine-learning architecture response message comprises a third machine-learning architecture associated with at least one of the second end-to-end machine-learning architectures.

Example 21: A network-slice manager comprising:

a processor and memory system configured to perform the method of any of examples 12-20.

Example 22: A system comprising:

a user equipment of example 12; and a network-slice manager of example 21, the processor and memory system of the network-slice manager comprising a second processor and a second memory system.

What is claimed is:

1. A method performed by a user equipment, the method comprising:

executing a first application associated with a first requested quality-of-service level;

selecting a first machine-learning architecture based on the first requested quality-of-service level;

transmitting, to a network-slice manager of a wireless network, a first machine-learning architecture request message to request permission to use the first machine-learning architecture;

receiving, from the network-slice manager, a first machine-learning architecture response message that grants permission to use the first machine-learning architecture based on a first network slice, the first machine-learning architecture forming a portion of at least one first end-to-end machine-learning architecture associated with the first network slice, the at least one first end-to-end machine-learning architecture being a distributed machine-learning architecture that is configured to process wireless communication signals and is formed by the first machine-learning architecture implemented by the user equipment, a machine-learning architecture implemented by a base station, and a machine-learning architecture implemented by an entity of a core network; and wirelessly communicating data for the first application using the first machine-learning architecture, the first machine-learning architecture being configured to compute an output based on an input using coefficients determined by the user equipment.

2. The method of claim 1, wherein the selecting of the first machine-learning architecture comprises:

receiving, from the network-slice manager, an available machine-learning architecture message that identifies available machine-learning architectures associated with the first network slice; and choosing the first machine-learning architecture from the available machine-learning architectures.

3. The method of claim 1, wherein the selecting of the first machine-learning architecture comprises:

receiving, from the network-slice manager, a machine-learning architecture selection message that comprises one or more selection rules; and executing the one or more selection rules to determine the first machine-learning architecture.

4. The method of claim 1, further comprising:

selecting a second machine-learning architecture;

transmitting, to the network-slice manager, a second machine-learning architecture request message to request permission to use the second machine-learning architecture; and receiving, from the network-slice manager, a second machine-learning architecture response message that grants permission to use the second machine-learning architecture based on a second network slice.

5. The method of claim 4, further comprising:

wirelessly communicating other data for the first application using the second machine-learning architecture, wherein:

the selecting of the second machine-learning architecture is based on the first requested quality-of-service level; and the selecting of the second machine-learning architecture is responsive to at least one of the following:

the user equipment moving to a geographical location associated with a different base station or a different tracking area; and the user equipment roaming between a home network and a visited network.

6. The method of claim 1, further comprising:

executing a second application associated with a second requested quality-of-service level;

selecting a second machine-learning architecture based on the second requested quality-of-service level;

transmitting, to the network-slice manager, a second machine-learning architecture request message to request permission to use the second machine-learning architecture; and receiving, from the network-slice manager, a second machine-learning architecture response message that grants permission to use the second machine-learning architecture based on the first network slice or a second network slice.

7. The method of claim 6, further comprising:

responsive to receiving the second machine-learning architecture response message, wirelessly communicating other data for the second application using the second machine-learning architecture, wherein:

the selecting of the second machine-learning architecture is based on the second requested quality-of-service level;

the executing of the second application occurs during at least an overlapping portion of time that the first application is executed; and the using of the first machine-learning architecture and the using of the second machine-learning architecture both occur during at least the overlapping portion of time.

8. The method of claim 1, further comprising:

executing a third application associated with a third requested quality-of-service level;

selecting a third machine-learning architecture based on the third requested quality-of-service level;

transmitting, to the network-slice manager, a third machine-learning architecture request message to request permission to use the third machine-learning architecture;

receiving, from the network-slice manager, a third machine-learning architecture response message that does not grant permission to use the third machine-learning architecture;

responsive to receiving the third machine-learning architecture response message, selecting a default machine-learning architecture;

transmitting, to the network-slice manager, a fourth machine-learning architecture request message to request permission to use the default machine-learning architecture;

receiving, from the network-slice manager, a fourth machine-learning architecture response message that grants permission to use the default machine-learning architecture based on a third network slice; and wirelessly communicating additional data for the third application using the default machine-learning architecture.

9. A method performed by a network-slice manager, the method comprising:

creating a first network slice for supporting a first quality-of-service level;

associating the first network slice with at least one available end-to-end machine-learning architecture capable of meeting the first quality-of-service level, wherein each of the at least one available end-to-end machine-learning architecture is a distributed machine-learning architecture that is configured to process wireless communication signals and is formed by a machine-learning architecture implemented by a user equipment, a machine-learning architecture implemented by a base station, and a machine-learning architecture implemented by an entity of a core network;

receiving, from the user equipment, a first machine-learning architecture request message that requests permission to use a first machine-learning architecture, the first machine-learning architecture being configured to process the wireless communication signals;

determining whether the first machine-learning architecture forms a portion of the at least one available end-to-end machine-learning architecture associated with the first network slice; and upon determining that the first machine-learning architecture forms a portion of the at least one available end-to-end machine-learning architecture, transmitting, to the user equipment, a first machine-learning architecture response message that grants permission to use the first machine-learning architecture.

10. The method of claim 9, further comprising:

transmitting, to the user equipment, an available machine-learning architecture message that identifies the at least one available end-to-end machine-learning architecture.

11. The method of claim 9, further comprising:

transmitting, to the user equipment, a machine-learning architecture selection message that comprises one or more selection rules enabling the user equipment to determine the first machine-learning architecture.

12. The method of claim 9, further comprising:

creating a second network slice;

receiving, from the user equipment, a second machine-learning architecture request message to request permission to use a second machine-learning architecture;

determining that the second machine-learning architecture is not associated with any second end-to-end machine-learning architectures of the second network slice; and transmitting, to the user equipment, a second machine-learning architecture response message that does not grant permission to use the second machine-learning architecture.

13. The method of claim 12, wherein the second machine-learning architecture response message comprises a third machine-learning architecture associated with at least one of the second end-to-end machine-learning architectures.

14. An apparatus for wireless communication at a user equipment, comprising:

a transceiver;

a memory; and a processor coupled to the memory and the transceiver, the processor configured to:

execute a first application associated with a first requested quality-of-service level;

select a first machine-learning architecture based on the first requested quality-of-service level;

transmit, to a network-slice manager of a wireless network, a first machine-learning architecture request message to request permission to use the first machine-learning architecture;

receive, from the network-slice manager, a first machine-learning architecture response message that grants permission to use the first machine-learning architecture based on a first network slice, the first machine-learning architecture forming a portion of at least one first end-to-end machine-learning architecture associated with the first network slice, the at least one first end-to-end machine-learning architecture being a distributed machine-learning architecture that is configured to process wireless communication signals and is formed by the first machine-learning architecture implemented by the user equipment, a machine-learning architecture implemented by a base station, and a machine-learning architecture implemented by an entity of a core network; and wirelessly communicate data for the first application using the first machine-learning architecture, the first machine-learning architecture being configured to compute an output based on an input using coefficients determined by the user equipment.

15. The apparatus of claim 14, wherein the selection of the first machine-learning architecture configures the processor to:

receive, from the network-slice manager, an available machine-learning architecture message that identifies available machine-learning architectures associated with the first network slice; and choose the first machine-learning architecture from the available machine-learning architectures.

16. The apparatus of claim 14, wherein the selection of the first machine-learning architecture configures the processor to:

receive, from the network-slice manager, a machine-learning architecture selection message that comprises one or more selection rules; and execute the one or more selection rules to determine the first machine-learning architecture.

17. The apparatus of claim 14, the processor further configured to:

select a second machine-learning architecture;

transmit, to the network-slice manager, a second machine-learning architecture request message to request permission to use the second machine-learning architecture; and receive, from the network-slice manager, a second machine-learning architecture response message that grants permission to use the second machine-learning architecture based on a second network slice.

18. The apparatus of claim 17, the processor further configured to:

wirelessly communicate other data for the first application using the second machine-learning architecture, wherein:

the selection of the second machine-learning architecture is based on the first requested quality-of-service level; and the selection of the second machine-learning architecture is responsive to at least one of the following:

the user equipment moving to a geographical location associated with a different base station or a different tracking area; and the user equipment roaming between a home network and a visited network.

19. The apparatus of claim 14, the processor further configured to:

execute a second application associated with a second requested quality-of-service level;

select a second machine-learning architecture based on the second requested quality-of-service level;

transmit, to the network-slice manager, a second machine-learning architecture request message to request permission to use the second machine-learning architecture; and receive, from the network-slice manager, a second machine-learning architecture response message that grants permission to use the second machine-learning architecture based on the first network slice or a second network slice.

20. The apparatus of claim 19, the processor further configured to:

responsive to receive the second machine-learning architecture response message, wirelessly communicate other data for the second application using the second machine-learning architecture, wherein:

the selection of the second machine-learning architecture is based on the second requested quality-of-service level;

the execution of the second application occurs during at least an overlapping portion of time that the first application is executed; and the use of the first machine-learning architecture and the using of the second machine-learning architecture both occur during at least the overlapping portion of time.

* * * * *